Nov. 5, 1957 — J. W. ELDRED — 2,811,815
CONTINUOUS GLASS MOLDING MACHINE
Filed Feb. 11, 1954 — 16 Sheets-Sheet 1

INVENTOR
JOHN W. ELDRED
BY
ATTORNEY

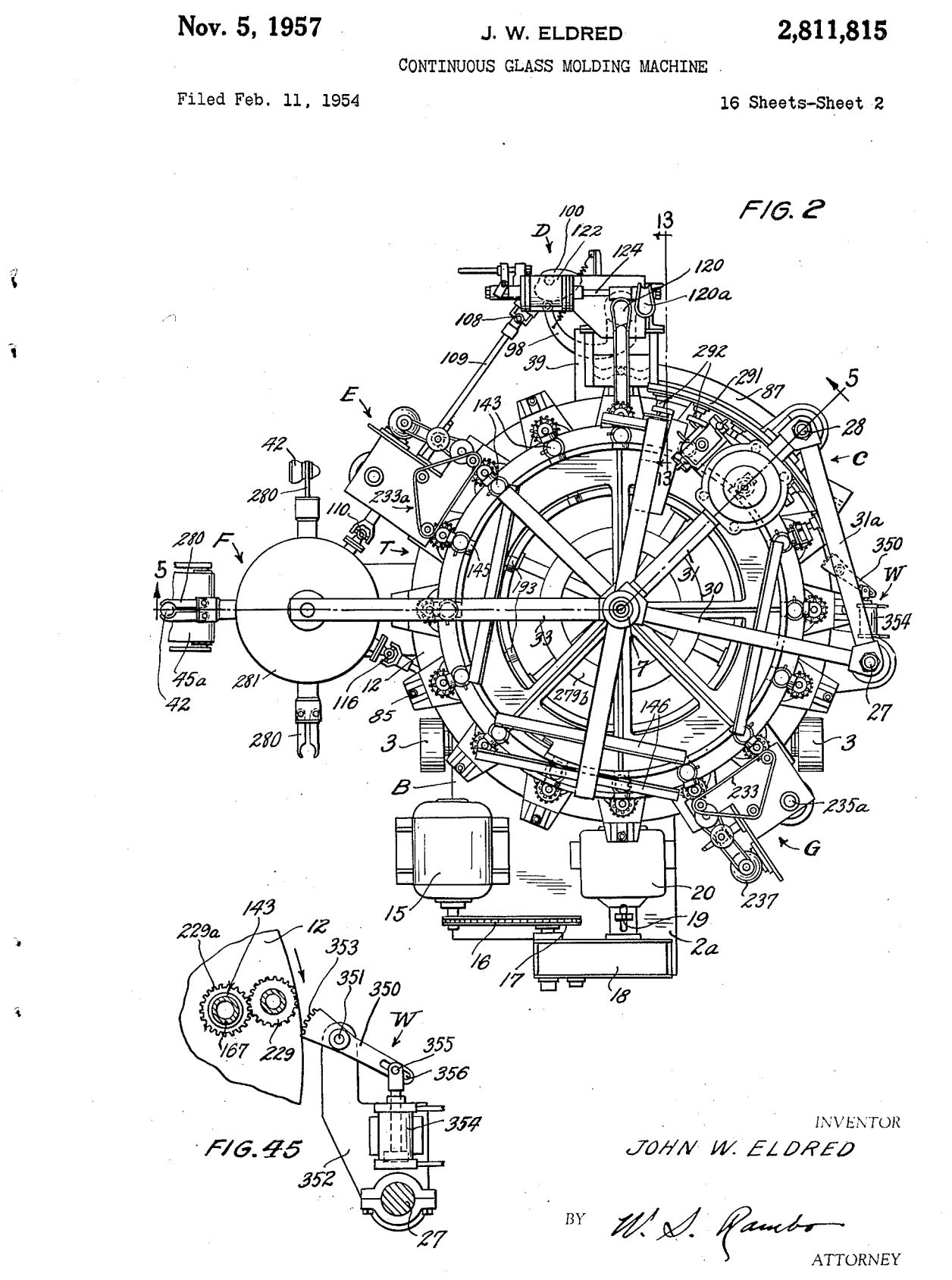

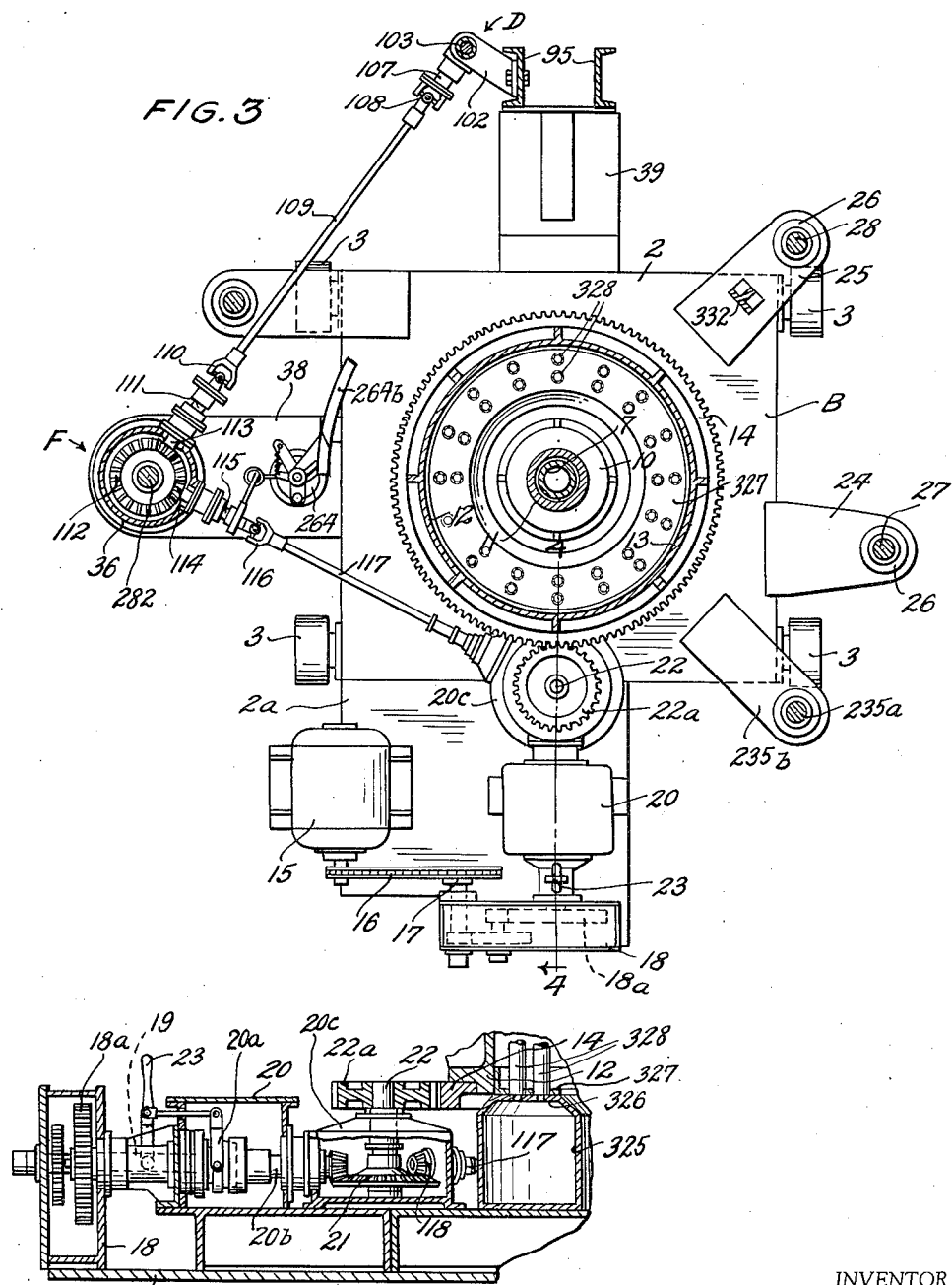

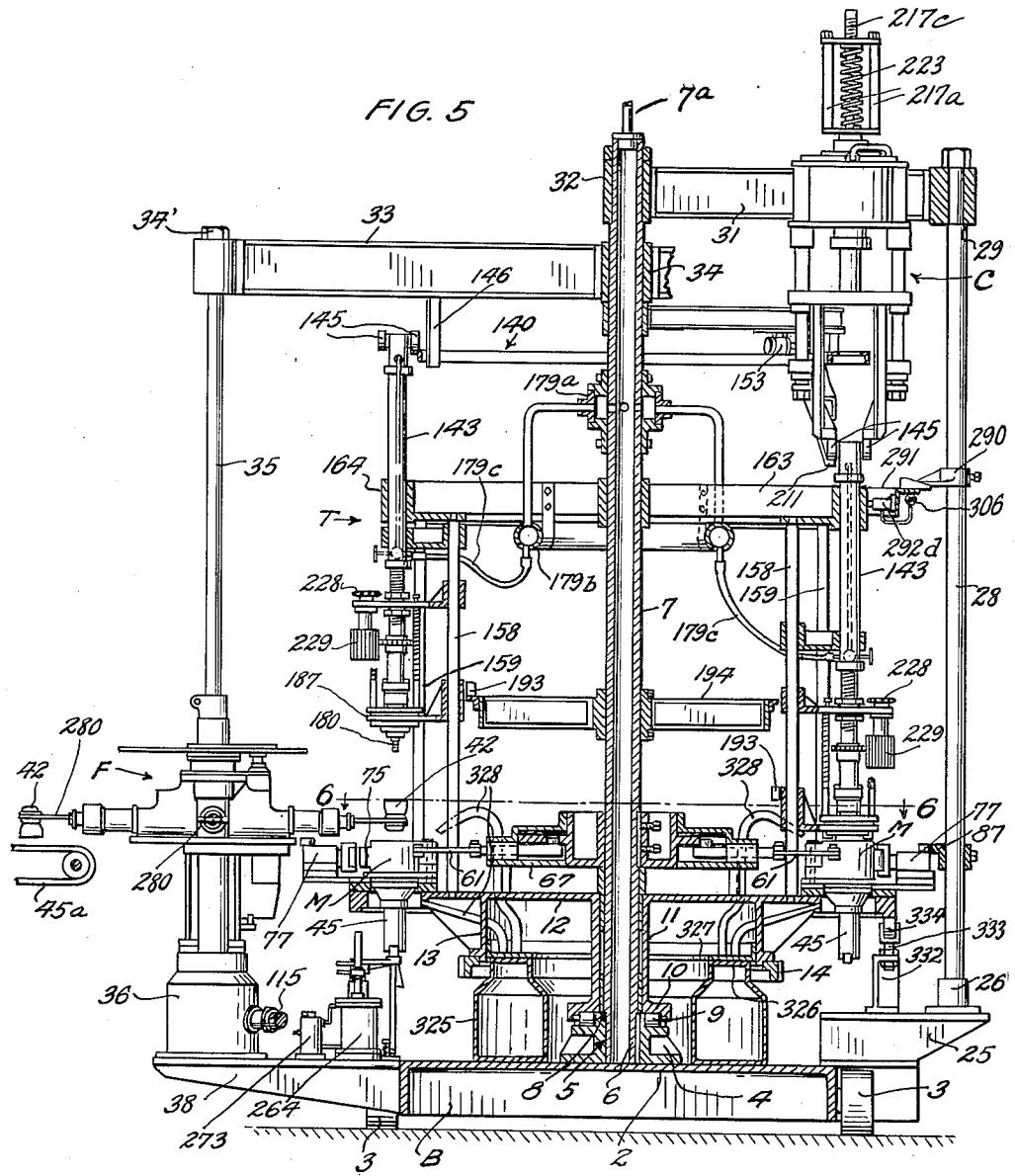

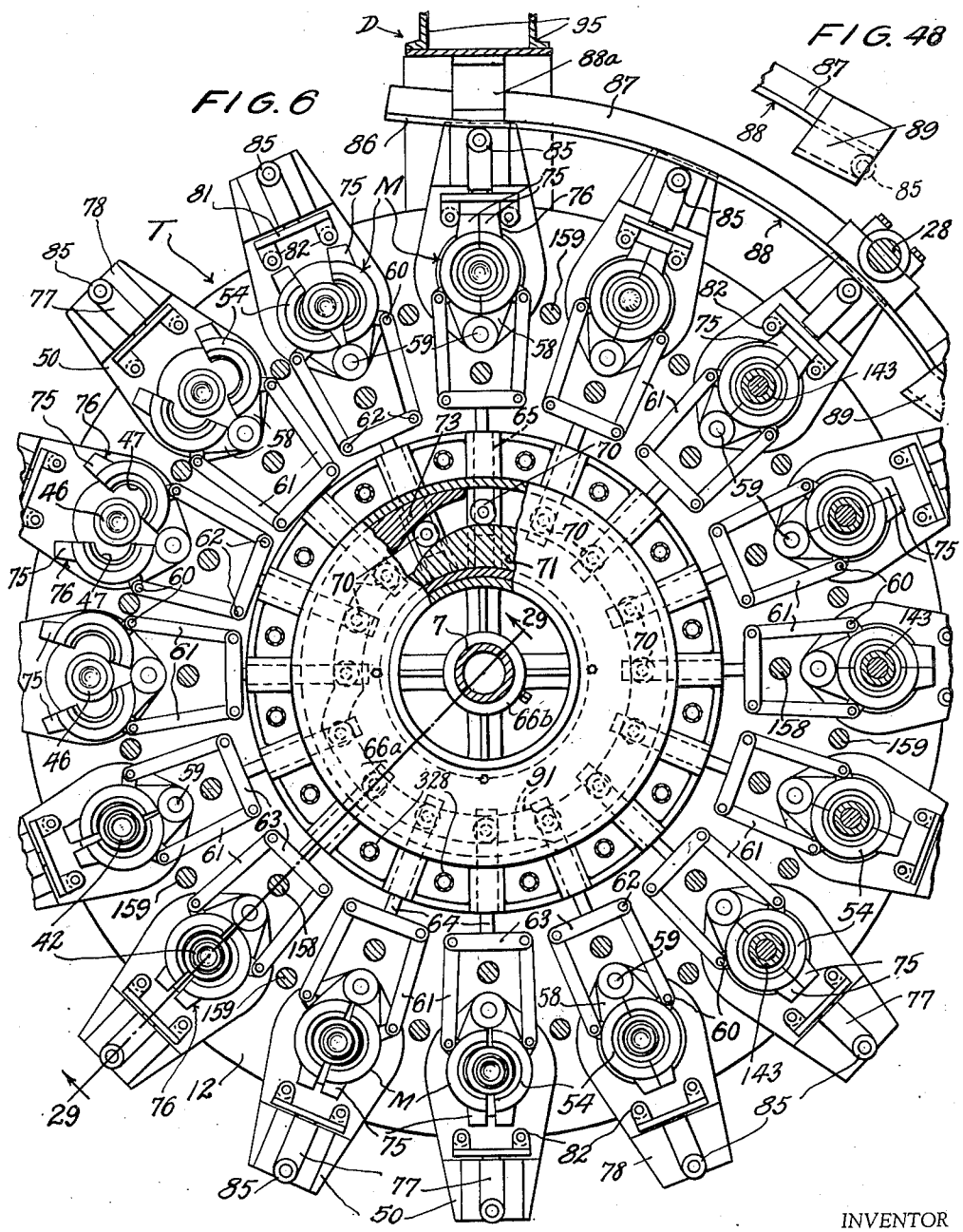

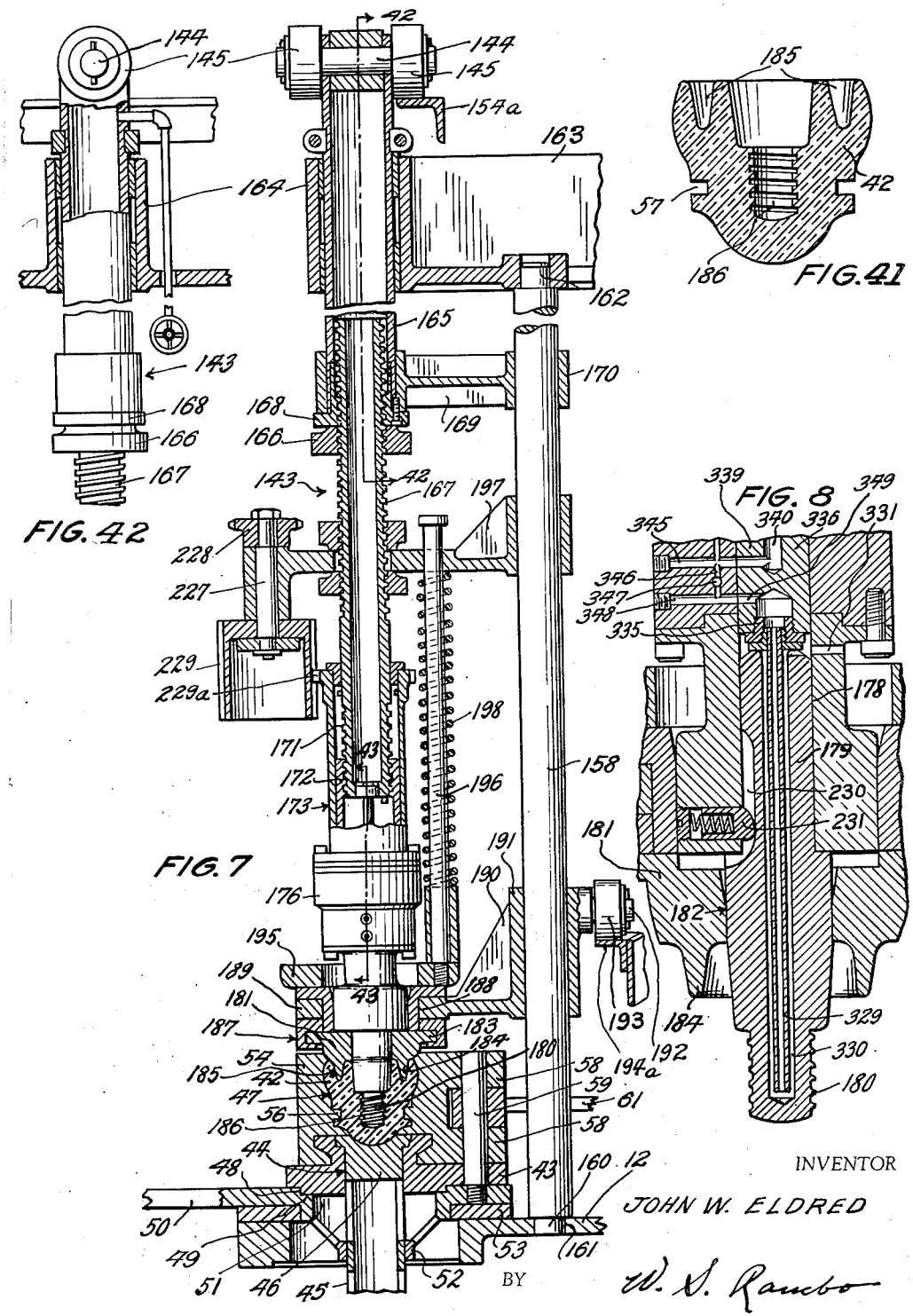

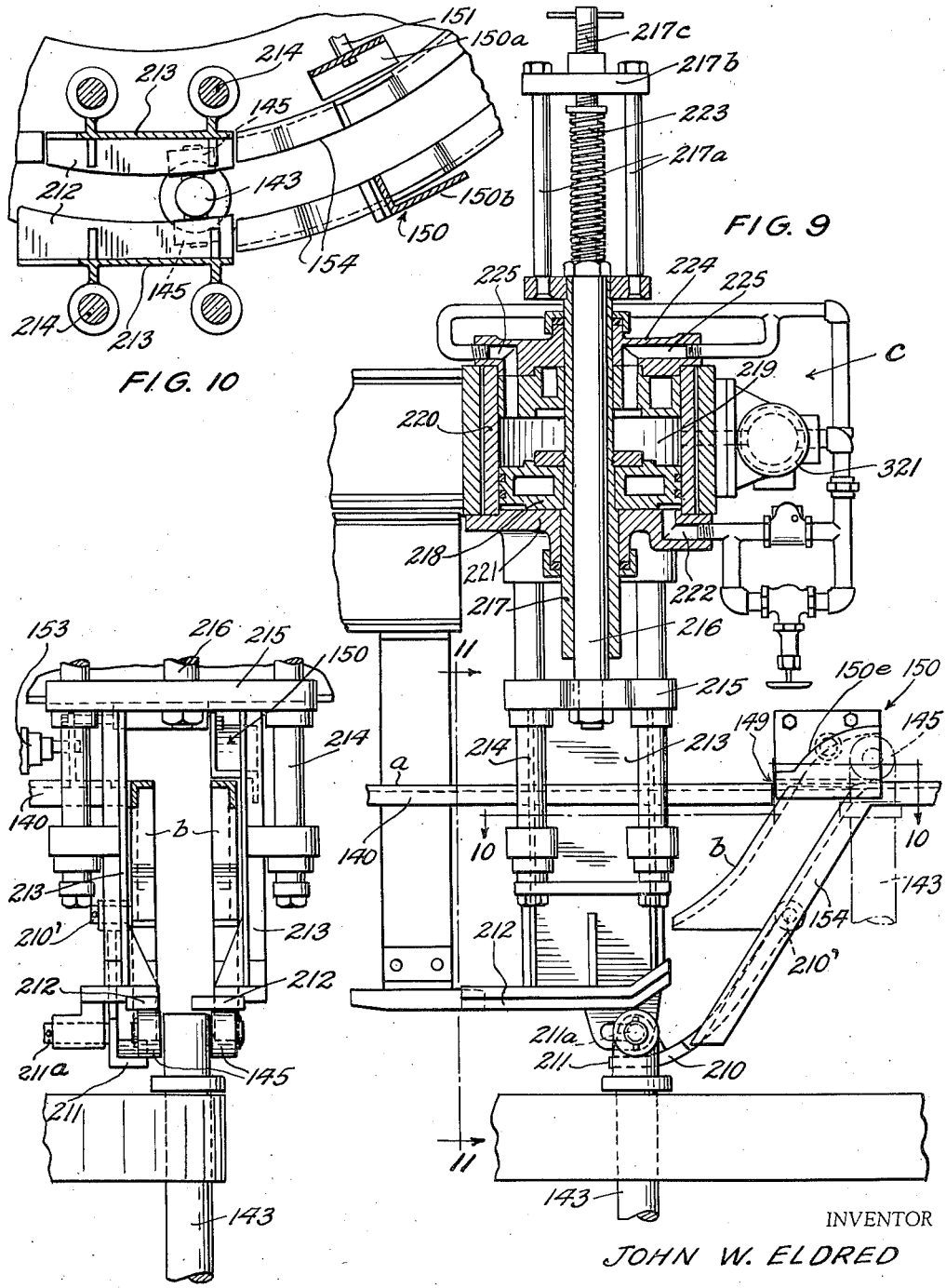

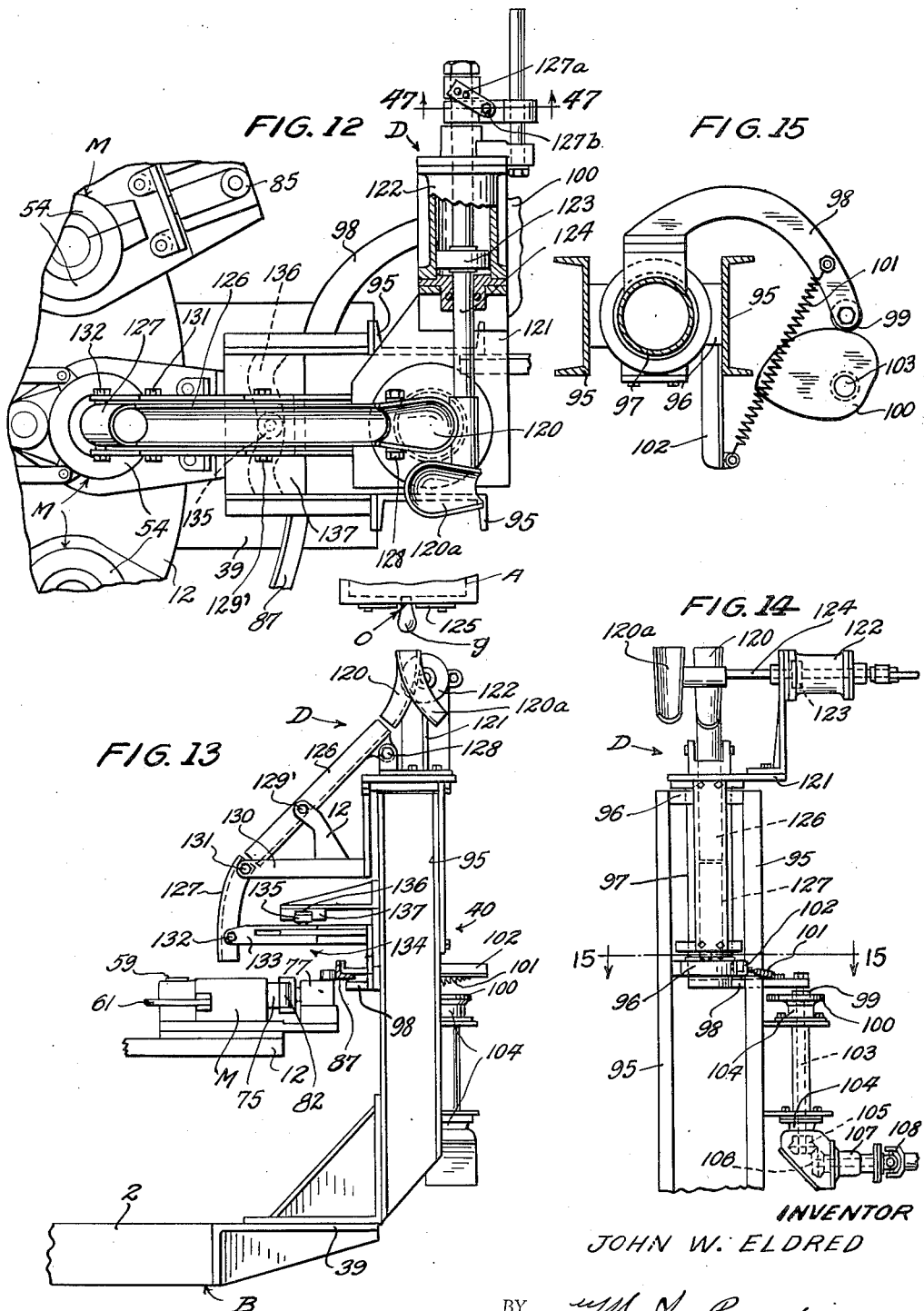

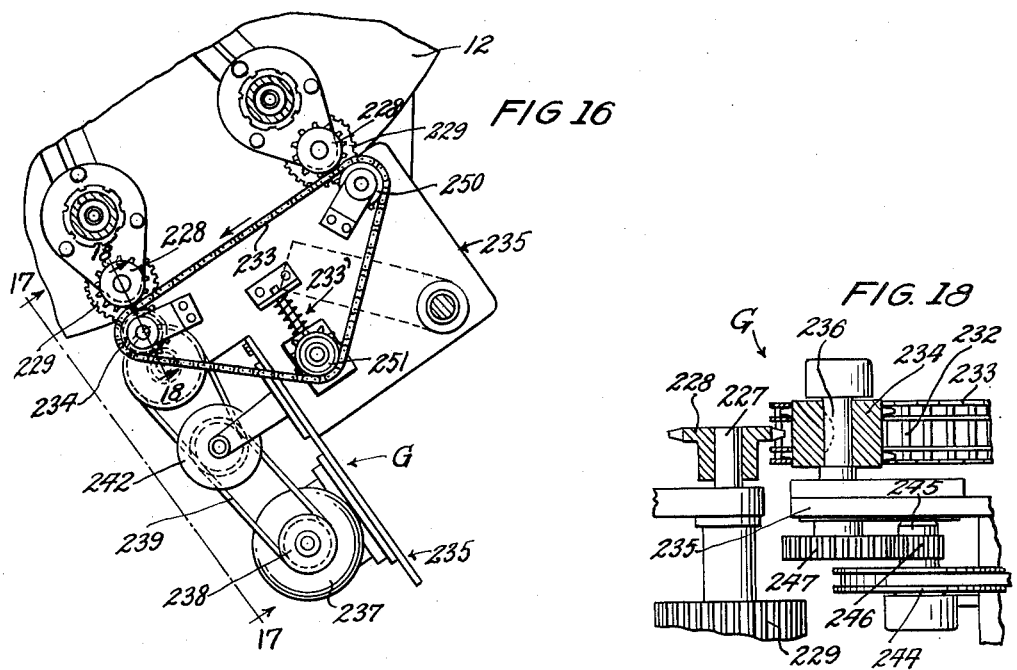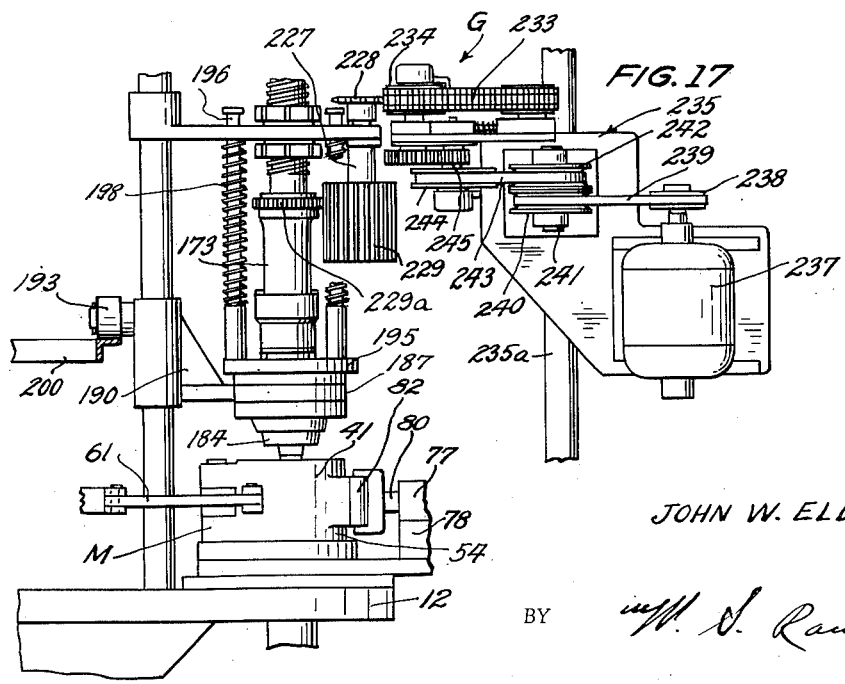

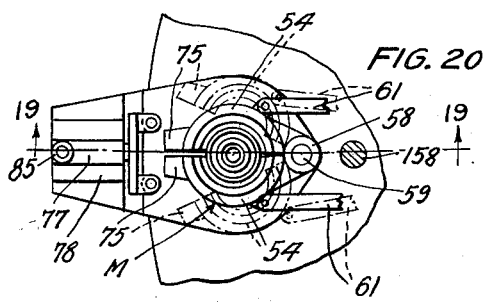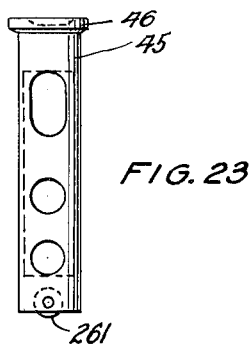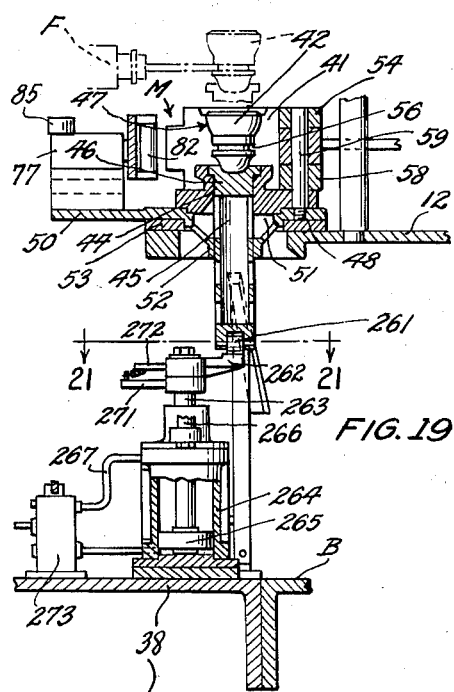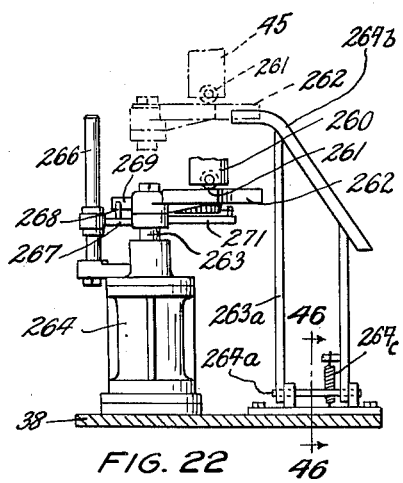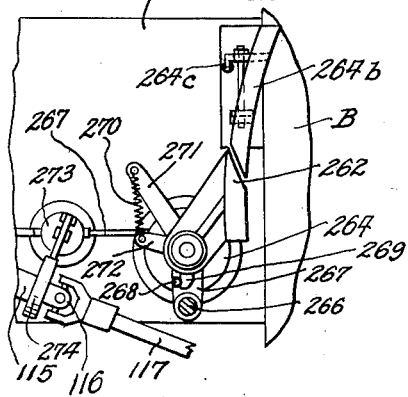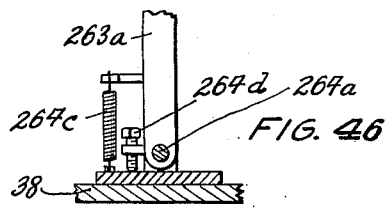

Nov. 5, 1957  J. W. ELDRED  2,811,815
CONTINUOUS GLASS MOLDING MACHINE
Filed Feb. 11, 1954  16 Sheets-Sheet 11

INVENTOR
JOHN W. ELDRED
BY
ATTORNEY

Nov. 5, 1957  J. W. ELDRED  2,811,815
CONTINUOUS GLASS MOLDING MACHINE
Filed Feb. 11, 1954  16 Sheets-Sheet 12
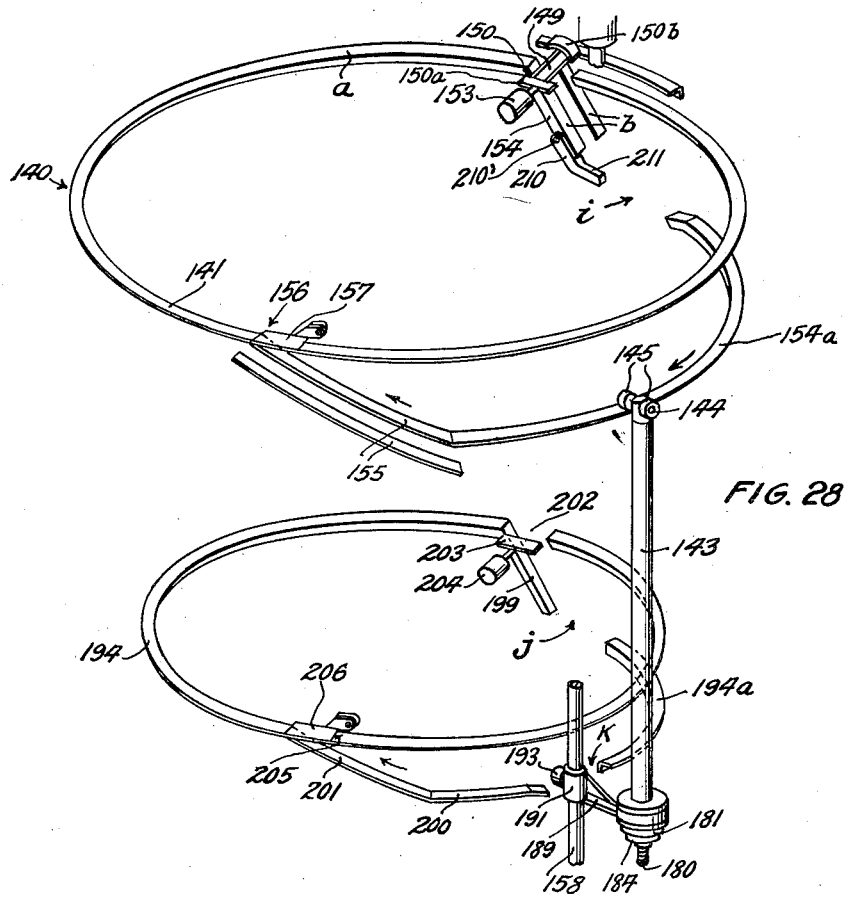
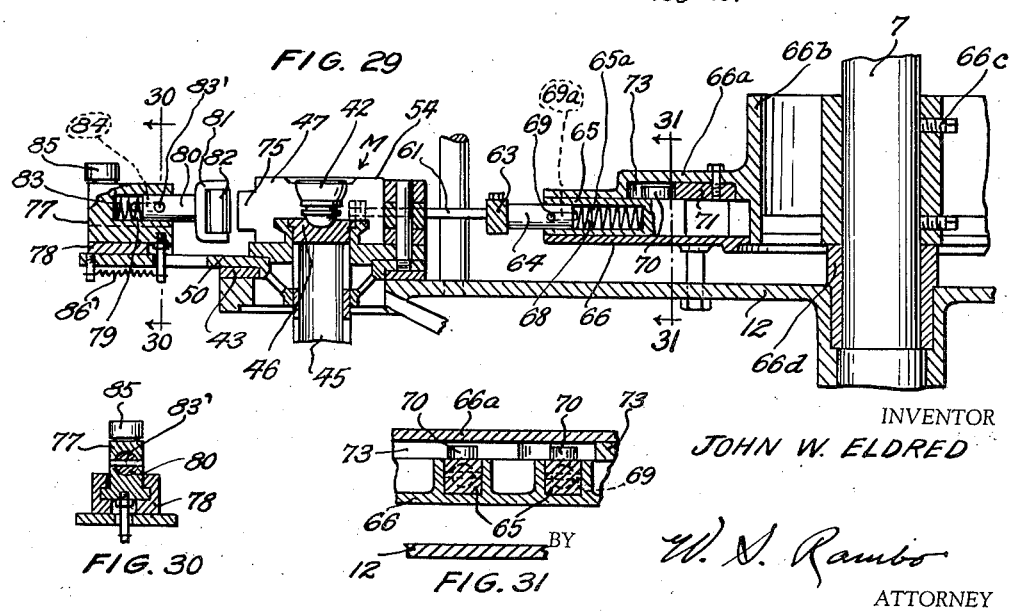
INVENTOR
JOHN W. ELDRED
BY
W. N. Rambo
ATTORNEY Nov. 5, 1957 J. W. ELDRED 2,811,815
CONTINUOUS GLASS MOLDING MACHINE
Filed Feb. 11, 1954 16 Sheets-Sheet 13

INVENTOR
JOHN W. ELDRED

BY
ATTORNEY

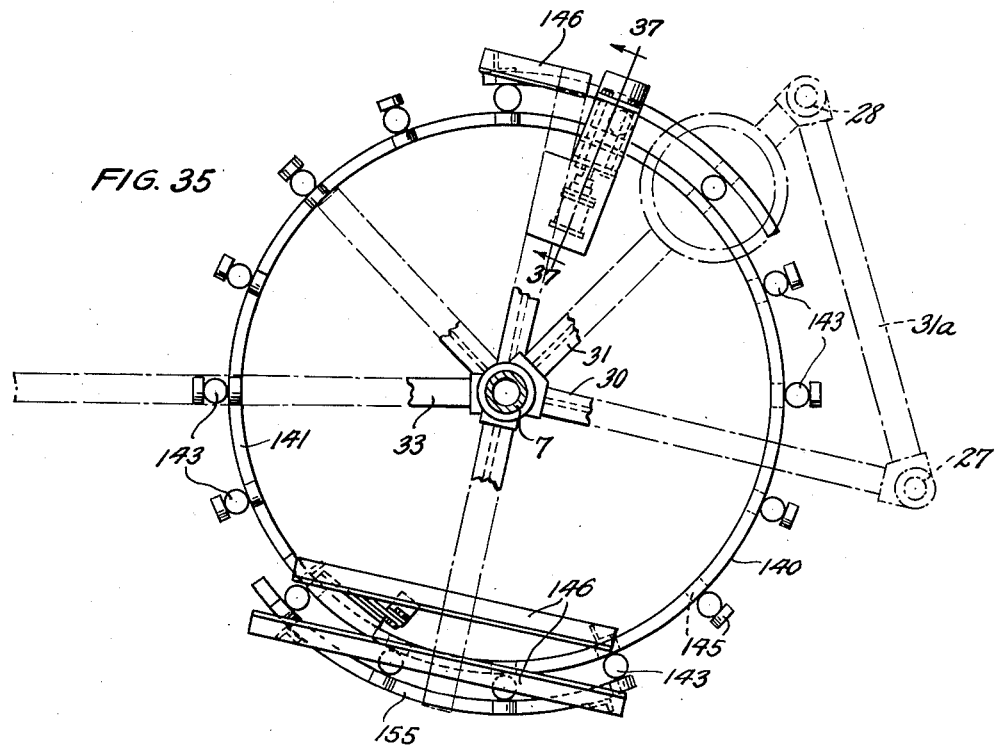
FIG. 35
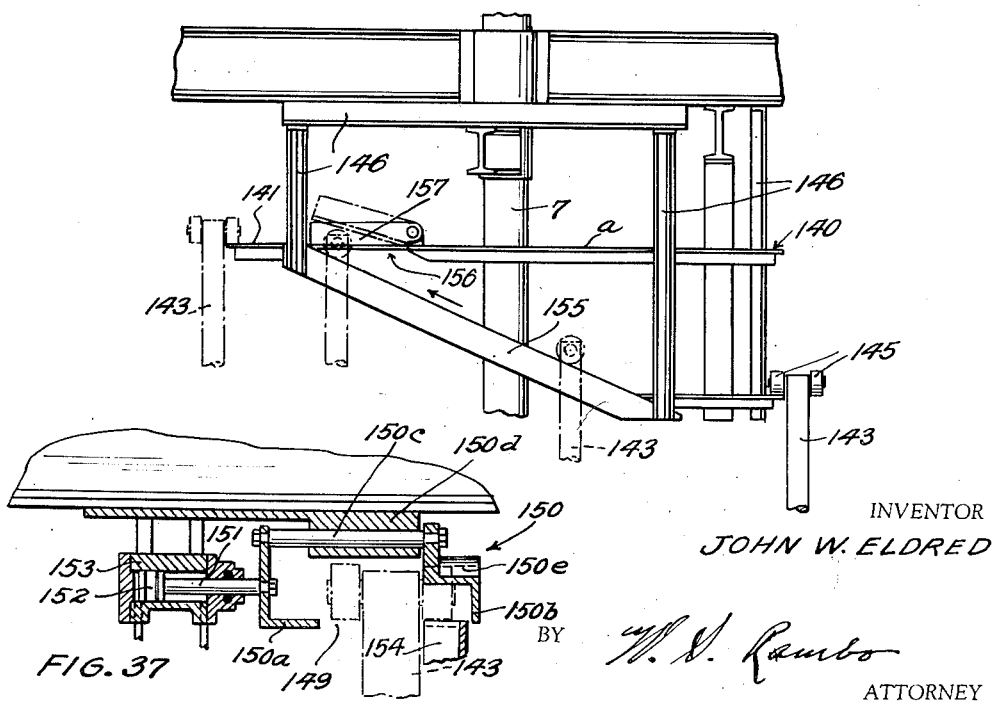
FIG. 36
FIG. 37
INVENTOR
JOHN W. ELDRED
BY
ATTORNEY

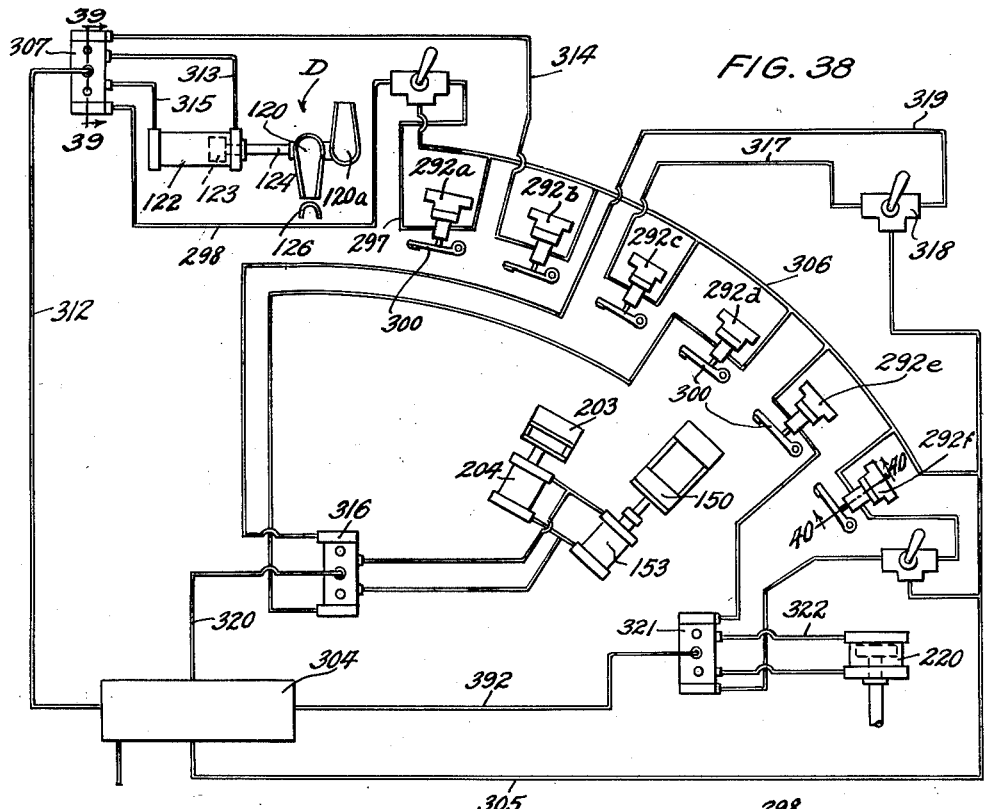
FIG. 38
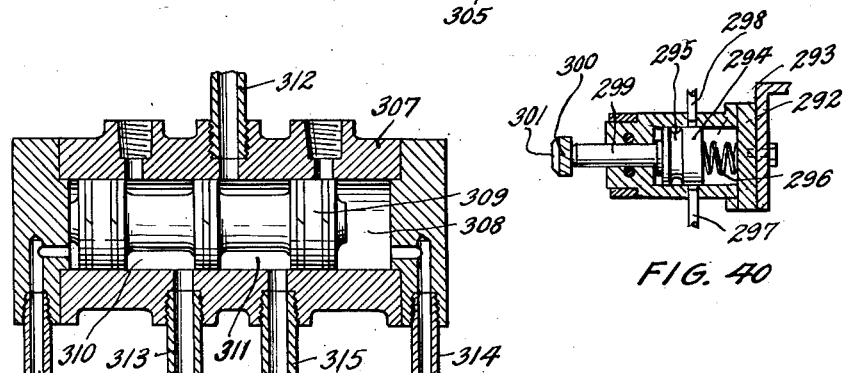
FIG. 40
FIG. 39
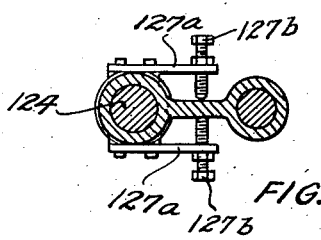
FIG. 47
INVENTOR
JOHN W. ELDRED Nov. 5, 1957   J. W. ELDRED   2,811,815
CONTINUOUS GLASS MOLDING MACHINE
Filed Feb. 11, 1954   16 Sheets-Sheet 16

INVENTOR
JOHN W. ELDRED
BY W. S. Rambo
ATTORNEY ically
United States Patent Office 2,811,815
Patented Nov. 5, 1957

2,811,815

CONTINUOUS GLASS MOLDING MACHINE

John W. Eldred, Columbus, Ohio

Application February 11, 1954, Serial No. 409,572

12 Claims. (Cl. 49—36)

The present invention relates to molding machines, having particular reference to an improved continuously operating machine formed to utilize a constantly rotating mold structure, by which a high productive output is provided for forming molding articles of various kinds from glass and other moldable materials.

In prior machines for the formation of such molded articles, it has been customary to impart intermittent motion to rotary mold-supporting tables. This motion has been employed in order to provide for control in the timed feeding of bodies of molten material into mold assemblies while the mold tables of such machines are momentarily at rest. Also, the construction provides for the pressing of the deposited material in the cavities of the mold assemblies and the opening of said assemblies for the removal of formed articles of glassware therefrom at intervals of time in which the mold table has its rotation arrested. Such intermittent movement, while providing properly timed operation of different machine parts, nevertheless distinctly reduces or interferes with the ware output rate potential of such machines.

Therefore, it is a particular object of the present invention to provide a molding machine of the kind indicated in which sustained or continuous rotary motion is imparted to a mold-supporting structure, so that all operations in the formation of molded articles by the machine take place during such continuous rotation of the mold structure, whereby to provide in such a machine a high rate of finished ware output, and one wherein the intermittent operations characteristic of prior automatic molding machines of this category are eliminated.

Another object of the invention is to provide a continuous molding machine employing a rotary mold-supporting table on which is carried a plurality of circumferentially spaced mold assemblies, and wherein an improved mechanism is provided for feeding gobs or gathers of molten glass or the like to each mold assembly, the mechanism being so constructed as to deliver successively the heated moldable material to the internal cavities of such assemblies while the rotary motion of the table is maintained, and whereby during each complete cycle of rotation of the table each of said mold assemblies will have deposited therein a gob or gather of said moldable material and which is shaped into article formation.

A further object of the invention is to provide a continuous molding machine of the character set forth wherein an improved plunger mechanism is provided on the mold table of the machine for continuous rotation with said table, and wherein reciprocatory motion is imparted to the plunger mechanism in a manner to displace and shape the molten molding material deposited in the mold assemblies, so that the molded articles produced in the machine will possess desired physical form, shape and dimensions.

A still further object of the invention is to provide in a continuously operating molding machine of this type a plurality of vertically movable plungers formed with article-shaping heads on their lower ends which are adapted for entering the mold assemblies and applying molding pressures to the moldable materials contained therein, thereby causing the materials to conform with the configuration of the cavities, provision being made for applying fluid pressure to the plungers as the same initially engage the moldable gob-material to effect positive shaping thereof into desired article formation and to compensate for weight variations in the gob-forming materials.

Another object of the invention is to provide a molding machine having a continuous rotating mold structure with which means are associated for automatically removing formed articles and transferring the articles to positions of discharge without interrupting the general rotation of the mold structure.

Still further objects of the invention are: to provide in an automatic machine for molding articles of glassware an improved table-mounted mold assembly composed of a plurality of pivotally movable cavity-forming jaw members and wherein a vertically movable plunger is provided for each of said assemblies, the plunger being formed with a fluid-pressed plug extension provided with external threads by which screw-threaded sockets are molded in the articles produced by the machine; to provide mechanism of this character in which the aforesaid plug extensions are yieldably supported by the mold plungers so that said extensions will be adapted automatically to working variations which will exist in the precise amounts of molten glass introduced into each complete mold assembly during the operation of the machine, the extensions responding to such variations moving into and away from the cavities of such mold assemblies in increasing or diminishing the effective glass-holding capacity thereof; to provide an improved fluid-delivery structure for cooling the hot glass contacting members of the machine; and to provide a machine of this kind which constitutes an improvement generally on machines of the character defined.

By way of example, a preferred embodiment of my improved molding machine and parts thereof are illustrated in the accompanying drawings forming a part of this specification and wherein:

Fig. 2 is a top plan view of the machine.

Fig. 3 is a horizontal section taken through the base portion of the machine on the plane indicated by the line 3—3 of Fig. 1.

Fig. 4 is a detail vertical longitudinal sectional view taken through the drive mechanism for the mold-supporting table on the plane disclosed by the line 4—4 of Fig. 3.

Fig. 5 is a vertical longitudinal sectional view taken through the machine on the plane indicated by the line 5—5 of Fig. 2.

Fig. 6 is a horizontal sectional view taken on the plane indicated by the line 6—6 of Fig. 5 and showing more particularly the cam-actuated mechanism for opening and closing the jaws of the table-mounted mold assemblies.

Fig. 7 is an enlarged fragmentary vertical sectional view taken through one of the mold plungers and its associated mounting and mold-engaging head means.

Fig. 8 is a similar view on a somewhat larger scale showing the headed lower end of the plunger and its associated thread-forming plug.

Fig. 9 is a fragmentary vertical sectional view taken through the pressure cylinder employed in applying fluid pressures to the forming plungers in forcing molten glass or the like into article formation produced by the mold cavities. In this figure, there is also disclosed in front elevation the descending section of the track mechanism employed for raising and lowering the mold plungers.

Fig. 10 is a detail horizontal sectional view taken on the plane disclosed by the line 10—10 of Fig. 9.

Fig. 11 is a detail vertical sectional view taken on the plane indicated by the line 11—11 of Fig. 9.

Fig. 12 is a fragmentary plan view disclosing the gob-depositing mechanism of the molding machine, part of the cylinder structure shown in this figure being broken away and shown in section.

Fig. 13 is a side elevational view of the deposit mechanism as disclosed by line 13—13 of Fig. 2.

Fig. 14 is a rear elevational view of the deposit mechanism.

Fig. 15 is a horizontal sectional view taken on the line 15—15 of Fig. 14.

Fig. 16 is an enlarged plan view, partly in horizontal section, disclosing the plunger up-threading mechanism of the present invention.

Fig. 17 is a sectional view taken on the plane indicated by the line 17—17 of Fig. 16 and disclosing mainly in elevation the up-threading mechanism.

Fig. 18 is a detail sectional view on the line 18—18 of Fig. 16.

Fig. 19 is a detail vertical sectional view taken on the line 19—19 of Fig. 20 through the mold table and one of the mold assemblies positioned thereon and disclosing the base-carried ejecting mechanism arranged beneath the same for elevating molded articles from the mold assembly to a position for engagement by an associated take-out mechanism.

Fig. 20 is a top plan view of the mold assembly disclosed in Fig. 19, and showing in dotted lines the jaws of the molded assembly in their open or spread-apart positions.

Fig. 21 is a top plan view partly in horizontal section, on the plane indicated by the line 21—21 of Fig. 19.

Fig. 22 is a view in elevation showing the raising cylinder for the ejector mechanism.

Fig. 23 is a fragmentary elevational view of the ejector sleeve.

Fig. 28 is a diagrammatic perspective view disclosing the upper and lower plunger actuating trackways and showing the paths of travel of one of the plungers thereover.

Fig. 29 is a detail vertical sectional view taken on the line 29—29 of Fig. 6 through the mold table and one of the mold assemblies carried thereby and disclosing the cam-actuated mechanism for opening and closing the jaws of the mold assemblies and the related means for locking the jaws in their positions of relative closure.

Fig. 30 is a detail vertical transverse sectional view on the line 30—30 of Fig. 29.

Fig. 31 is a similar view on the line 31—31 of Fig. 29.

Fig. 35 is a diagrammatic top plan view of the circular upper trackway for the support and guidance of the vertical plungers.

Fig. 36 is a side elevational view of the apparatus disclosed in Fig. 35.

Fig. 37 is a vertical transverse sectional view taken on the line 37—37 of Fig. 35.

Fig. 38 is a diagrammatic circuit view disclosing the various automatic controls for the several mechanisms of the molding machine forming the present invention.

Fig. 39 is a vertical longitudinal sectional view on the line 39—39 of Fig. 38.

Fig. 40 is a similar view showing a longitudinal sectional view through one of the trip actuated control valves on the plane disclosed by the line 40—40 of Fig. 38.

Fig. 41 is an enlarged vertical sectional view taken through the body of a glass insulator produced by the machine of the present invention.

Fig. 42 is a detail vertical sectional view taken through the upper part of the turret on substantially the line 42—42 of Fig. 7.

Fig. 45 is a detail horizontal sectional view taken on the line 45—45 of Fig. 1, and disclosing the initial automatically shiftable plug-releasing or "back-up" mechanism.

Fig. 46 is a detail sectional view of a part of the ware-ejector mechanism taken on the line 46—46 of Fig. 22.

Fig. 47 is a detail vertical sectional view on the line 47—47 of Fig. 12.

Fig. 48 is a detail plan view of the mold-releasing end of the mold-clamping cam rail.

Figure 1:
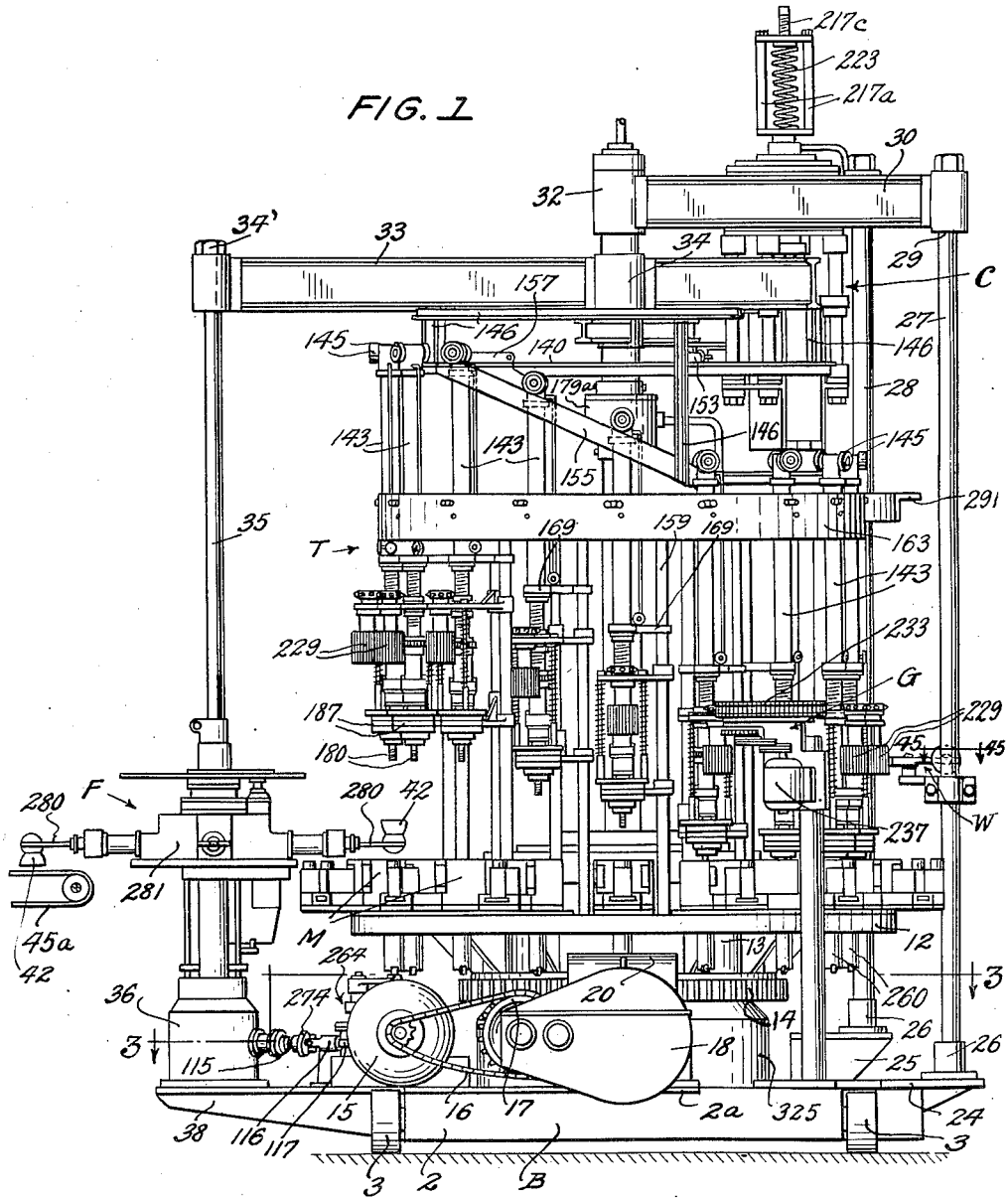
Fig. 1 is a side elevational view of a molding machine formed in accordance with the present invention.

Referring more particularly to the drawings, it will be noted therefrom that the molding machine of the present invention is formed to include a continuously rotating turret, indicated at T. The turret is supported for rotation on a semi-portable base B, turning about a substantially vertical stationary column 7 arising perpendicularly from the base. A suitable prime mover 15 and associated power-transmitting and controlling means are mounted on the base for imparting continuous rotation to the turret. The turret includes a revolving mold table 12 upon which is supported in circumferentially spaced order a plurality of molds M. Each of said molds comprises a plurality of pivotally connected jaws 54 mounted for opening and closing movement on the upper surface of the turret table, mechanism being provided for automatically opening and closing the jaws of the molds at proper times and in given sectors of each complete cycle of rotation of the table, as will hereinafter more fully appear.

Carried by the base section B of my improved machine is a deposit mechanism D which is employed to introduce into each of the mold assemblies a gather or gob of molten glass or the like while the mold jaws are in positions of cavity-forming closure. The deposit mechanism includes a compound chute or trough mechanism mounted for bodily oscillatory movement about a vertical axis which is disposed radially outwardly from the vertical axis of the turret. The chute structure includes an adjustable cam-actuated discharge section 127, which is so formed as to maintain delivery registry with the mold assemblies as the latter are continuously rotated by the table.

In order to press the molten glass or other moldable material deposited in the turret molds, so that the glass will conform to the shape of the walls of the internally located mold cavities and thereby form, upon cooling and solidifying of the deposited glass gathers or gobs, articles of desired physical form, shape and dimensions, use is made of a plurality of vertically movable plungers 143 disposed above and in vertical registry with the mold assemblies. The base of the machine includes a stationary upright frame structure which carries contiguous to its upper region a circular trackway formed for the reception of rollers provided on the upper ends of the glass-pressing plungers 143. This circular trackway is formed with upper and lower levels which receive the rollered upper ends of the plungers 143 and during normal operation of the machine, impart vertical movement to the plungers. The upper and lower levels of the trackway serve to produce at timed intervals controlled ascent and descent of the plungers from and into the molding cavities of the turret molds. Upon descent of the plungers, the lower ends thereof engage the mold-deposited glass and press the same in a positive manner into mold-cavity formation. Also, the machine includes a fluid pressure cylinder means adapted to be operated when the plungers first reach the lower levels of the trackways to produce positive pressure on the formative glass within the mold cavities to obtain an improved and definite displacement of such glass into precise article formation.

In molding screw threads, for example, into the glass articles formed by my improved molding machine, the lower end of each of the pressing plungers includes a head in which is embodied an axially disposed threaded plug, the latter being adapted to be inserted in the molten glass within the molds to produce threaded openings or sockets therein. In association with this construction means are provided in the sustained and uninterrupted operation of the machine to unthread or upthread the aforesaid plugs to remove them from the molded objects or bodies. Further, the machine provides for the automatic opening of the movable jaws of the molds following the removal of the thread-forming plugs therefrom, and the contacting of the formed and solidified molded bodies by an automatic ejector, whereby to raise the molded bodies from the mold assemblies and to permit said bodies to be engaged by a discharging or take-off mechanism F, whereby to provide a molding machine characterized by its continuous rotary operation and the fact that all operations thereof are effected automatically in proper sequential order, producing a machine having a high output of finished molded ware and one wherein the need of manual controls is largely avoided.

Having thus generally described the construction and operation of my improved machine, reference should now be had to the structural form, part arrangements and operation of the mechanisms forming the specific embodiment of the molding machine as illustrated in detail in the accompanying drawings. In said drawings, the base B comprises a relatively heavy-ribbed casting 2. If desired, the latter may be provided with axle-supported wheels 3 having wide rims and possessing relatively small diameters, whereby portability of limited degree may be imparted to the machine.

Positioned centrally on the upper surface of the base casting is a stationary bracket 4 which, as shown in Fig. 5, is provided with a socket 5 for the tight-fitting reception of the reduced lower end 6 of an upright, stationary, tubular standard 7, the latter forming a part of a stationary base-carried frame. The standard 7 at its lower end is annularly shouldered as at 8 for seating engagement with the upper end of the bracket 4. Disposed on the upper end of the bracket 4 is a thrust-receiving antifriction bearing 9, and supported on this bearing for rotation about the standard 7 is a circular race-forming flange 10, which is provided at the lower end of a vertical and axially disposed hub 11 of a mold table 12.

Integrally formed with the table in surrounding concentric relation with the hub 11 is a vertical gear flange 13, the latter being formed with, or having rigidly joined thereto, a toothed gear ring 14. Mounted on an extension 2a of the casting 2 is the electric drive motor or other prime mover 15. In this instance, the armature shaft of the motor 15 is provided with a sprocket, the latter being employed, as shown in Figs. 3 and 4, in driving an endless chain 16. This chain, in turn, drives a sprocket 17 carried at one end of a gear box 18 mounted on the base extension 2a. The box includes internal speed-reducing gearing 18a from which projects a driven shaft 19, the latter extending into a housing 20 containing a manually controlled clutch mechanism 20a. The driven shaft 20b of this clutch mechanism extends into a gear casing 20c containing drive gearing 21 employed in rotating a vertical shaft 22. Mounted exteriorly of the housing 20 on the upper end of the shaft 22 is a gear 22a, the teeth of which mesh with those of the table gear ring 14, whereby to produce rotation of the table and turret assembly of which the table forms a part. The manually operated clutch 20a includes the control lever 23 which may be provided to interrupt the drive through the shaft 19, whereby to start and stop rotation of the table 12 independently of the operation of the motor 15.

Projecting from the casting 2 are rigid horizontally disposed bracket extensions 24 and 25, as shown more particularly in Fig. 3. These extensions carry at their outer ends ferrules 26 in which are positioned and secured the lower ends of vertically extending rods or stanchions shown at 27 and 28, and which form a part of the stationary upright base-mounted frame. The upper ends of these rods or stanchions are shouldered as at 29 and are received within sockets formed in radially extending horizontally disposed frame struts, shown at 30 and 31 and a tangential base strut 31a. The inner ends of the struts 30 and 31 terminate in a hub structure 32 which as shown in Fig. 1 is seated upon the shouldered upper end of the column or standard 7, the construction forming a substantial rigid base-mounted frame. This frame is formed further to include another horizontal and radially disposed strut 33, as shown in Figs. 1 and 5, the strut 33 having a hub 34 which is stationarily positioned on the standard 7 below the hub structure 32. The outer end of the strut 33 is joined as at 34' with the upper end of the vertical standard 35 which arises stationarily from a housing 36 of the article-removing or "take-out" mechanism F. In this instance, the housing 36 has been shown in Fig. 3 as supported on a lateral extension 38 projecting from one side of the base casting.

The casting 2 is formed at the rear thereof with a horizontal extension 39. This extension is employed for effecting the support of the molten glass depositing mechanism D. Through the use of this mechanism gathers or gobs of molten glass may be delivered successively to and deposited in a plurality of the forms or mold assemblies shown at 41. These assemblies are arranged, as shown in Fig. 6, in spaced circular order on the turret table 12 contiguous to its outer circumference. Glass or the like so deposited while in a moldable formative state in the mold assemblies, and as the table is being continuously rotated, is subjected to forming and shaping pressures which, in the construction of the machine as here illustrated, produce formed glass bodies 42 possessing the configuration shown in Fig. 41. These bodies may be adapted for many different purposes and, of course, may possess a variety of shapes, but as here shown the same are adapted for use as insulators in the stringing of conductor wires on the cross members of telephone and other poles, supports or masts used in the elevated support of such conductor wires.

Each of the form or mold assemblies comprises, as shown in Fig. 7, a table-mounted base ring 43, the latter being formed with a vertically extending opening 44 for the reception of a vertically slidable article ejector sleeve 45. The upper end of the ejector sleeve terminates in a shouldered head 46 which forms normally the bottom of a molding cavity 47 of each mold assembly. Each of the rings 43 has its bottom face annularly shouldered as at 48 and positioned in a correspondingly formed seat 49 of a base plate 50. Each of the plates 50 is formed with a centrally disposed opening 51, arranged below and in vertical registry with the complemental opening 44 of the associated ring 43. Also projecting into the opening 51 of each base plate is a spider formed with a hub 52 for the slidable reception and guidance of the associated ejector sleeve 45. A spacing ring or shim 53 may be placed between the upper surface of the table 12 and the under surface of each of the base plates to control part positions.

Mounted on the top of the base ring 43 of each mold assembly is a pair of mold jaws 54. As shown in Figs. 6 and 20, each jaw comprises a substantially semi-circular body having inner walls which, when the jaws of each pair are in closed relation, define a gather or gob-receiving cavity or pocket 47, which possesses the outer configuration of the glass articles or bodies 42 to be formed by the machine. In this instance, and as above stated, the jaws are shaped to mold glass insulators, and, therefore, each complete cavity is of circular formation when viewed in plan, having inwardly projecting ribs 56, which produce one or more annular wire-receiving grooves 57 in the outer wall of each of the insulator bodies 42 formed by the molds. At the rear thereof each pair of jaws is formed with integral vertically registering apertured ears 58 adapted for the reception of a pin 59 arising stationarily and vertically from one end of an associated base plate 50, and extending through an opening in each of the base rings 43. The jaws 54 of each mold assembly swing about the vertical axis of its pin 59 in the opening and closing of said jaws in adapting the latter to receive molten glass deposits and in providing for the discharge or removal therefrom of finished ware.

As shown in Fig. 6, the molds are closed throughout substantially the greater portion of each complete cycle of rotation of the table 12. To actuate the jaws in producing, during proper periods in each cycle of operation of the table, the opening and closing of the molds, the jaws of each set have pivotally connected as at 60 to the sides thereof the outer ends of a pair of links 61. The inner ends of each cooperative pair of said links are pivotally united at 62 with the ends of a cross bar 63. Each cross bar is provided with an inwardly and radially extending shank 64, which as shown in Fig. 29, is slidably supported in one of a plurality of guide blocks 65 positioned for limited sliding movement radially and horizontally between a table-carried guide ring 66 and a stationary column-carried plate 66a. The plate 66a is formed with a hub 66b, which is fastened as at 66c to the vertical standard 7, the hub 66b being maintained in spaced relation from the turret table 12 by means of a sleeve shown at 66d.

The inner end of each shank 64 is slidably received in a block 65. These blocks in turn are formed with sockets 65a to receive the shanks 64. A coil spring 68 is arranged in each socket 65a between the inner end of the shank 64 and the closed end of the socket 65a. A pin 69 may pass through each of the shanks 64 with the ends thereof slidably received in elongated slots 69a formed in the blocks 65.

Each of the blocks 65 carries at the inner end thereof a roller 70, which is maintained by the action of an associated spring 68 in contact with the irregular peripheral surface of an inner cam 71 carried by the plate 66a. The plate 66a also carries, as shown in Fig. 6, an outer cam 73 which cooperates with the rollers 70 in governing the inward and outward radial movement of the shanks 64 in the opening and closing of the mold jaws. By this construction it will be understood that the cams 71 and 73 form between them an irregular groove in which the rollers 70 are disposed for movement in unison with the rotary table. The cams are stationary, since they are carried by the standard-supported plate 66a, whereas the rollers 70 revolve in unison with the turret table, thus causing the jaw-actuating shank 64 to move radially inwardly and outwardly at specified times in the opening and closing of the molds. The pins 69 and the associated slots in which the ends of the pins are received compensate for misalignment in parts and prevent the parts from binding or sticking by providing relief between the cam rollers 70 and the mold connections.

It will be noted by reference to Fig. 6 that the jaws are maintained in their open positions when in registry with the take-out mechanism F. However, following the removal of finished ware from the molds, the continued rotation of the turret table causes the rollers 70 to be positioned between the cams 71 and 73 in a manner closing the jaws, so that deposits of molten glass may be produced within the mold cavities without loss and with proper shaping. In maintaining the jaws tightly closed and clamped together when a gob of molten glass, or other molding material, is initially deposited in each of the mold cavities 47 from the depositing mechanism D, the outer ends of each pair of jaws are formed with lips 75 having slightly tapered outwardly converging side surfaces 76.

Each of the base plates 50 of said mold, as shown in Figs. 6, 29 and 30, carries a block 77 which is slidable in a guide member 78 formed in connection with each base plate 50. Each block is formed with a bore 79 open at its inner end for the slidable reception of stem 80. Each stem carries at its inner end a yoke 81 and on which is supported, in transversely spaced vertical order, a pair of vertical clamping rolls 82. A spring 83 is confined in each bore 79 between its closed inner end and the stem 80 to force the associated stem and rolls 82 carried thereby inwardly. Each stem 80 is further formed with a transverse pin 83' which is received in a slot 84 formed in the associated guide members 78.

The top of each block 78 carries a roller 85 which is disposed so that it will, upon rotation of the turret, first engage with an angularly directed entrant region 86 of a stationary cam rail 87 carried by the vertical frame rod or stanchion 28. The entrant region of the cam rail is fastened to the frame of the depositing mechanism, as shown at 88a in Fig. 6. As the roller 85 of each block 77, during sustained rotation of the turret, contacts the region 86 of the cam rail, the block so engaged is forced inwardly against resistance of its spring 86', causing the clamping rolls 82 to ride against the slightly beveled sides 76 of the jaw lips 75, thereby holding the jaws firmly together and preventing positively their separation during the deposit of gobs composed of glass or other molten material therein.

The inner surface 88 of the cam rail, with which the roller 85 of each block 77 contacts following engagement with the entrant region 86, is of arcuate shape when viewed in plan and is disposed in concentric relation to the vertical turret axis 7. Adjacent to the end of the surface 88, the rollers 85 engage with a short outwardly extending deflector cam 89 (Figs. 6 and 48), which positively forces the rollers 85 and their blocks 77 outwardly to remove the rolls 82 from their positions of clamping engagement with the jaw lips 75. By the time the jaw lips are released from the rolls 82 through the operation of the cam 89, the molten material will have sufficiently cooled and solidified to permit of the release of the jaws by the rolls 82. However, the cam mechanism 72 and 73 through the associated linkage continues to hold the jaws in their closed order. The springs 86' may be employed for moving the blocks 77 to maintain contact between the rollers 85 and the rail 88 and to maintain the rolls 82 in their jaw-retracted positions.

As shown at 91 in Fig. 6, the outer cam surfaces of the ring 71 and inner surface of ring 73 are slightly inwardly offset, so that the roller race formed between the cams 71 and 73 will move the shanks 64 inwardly a sufficient distance to partially open the jaws or crack open the molds in order to free the same from extended surface contact with the hot molded articles and thereby facilitate the cooling and removal of the formed articles from the molds. It will be noted by reference to Fig. 6 that after the molds pass into the portion 91 of the cams 71 and 73, slight separation only of the molds takes place and this separation is continued until the molds are further opened and presented to the ejector mechanism. It will be noted that the inwardly offset region 91 of the cam structure is located just beyond the upthreading mechanism G used in the operation of the plunger mechanism 143. After passing through the region 91, the mold jaws are further opened by the cams 71 and 73, as previously described, to permit the article-removing or take-off mechanism F to function.

With the molds in their positions of closure on the revolving table the deposit mechanism D, which is carried by the base of the machine and is disposed in registry with the molten glass outlet O (Fig. 13) of a glass-melting furnace A, or other source of molten material supply, is actuated to deliver to the successive circularly placed molds, as the supporting table therefor is continuously rotated, a gob or gather of molten glass g or the like.

As shown more particularly in Figs. 12 through 15, the deposit mechanism D comprises an inclined gather-transmitting chute structure. The latter is mounted for oscillatory movement on a frame carried by the base of the machine and disposed contiguous to the outer periphery of the turret or mold table 12, the chute structure being supported for oscillatory movement about a vertical axis spaced outwardly and radially from the outer circumference of the table.

Thus, as shown in Figs. 12 and 13, the base 2 has mounted on the extension 39 thereof a pair of transversely spaced upright channel members 95. These channel members carry horizontal cross webs 96 in which is supported for turning movement about its vertical axis a cylinder 97. The lower end of this cylinder has secured thereto an outwardly and laterally directed curved arm 98, which carries at its outer end a roller 99, the latter being disposed for constant engagement with the periphery of an elliptical quick-return cam or its equivalent 100. A coil spring 101 is attached to the arm 98 and to a bracket 102 carried by one of the channel members 95 so that the roller 99 is maintained constantly in contact with the irregularly formed peripheral edge of the cam 100.

The cam 100 is fixed to the upper end of a vertically journaled shaft 103, which in turn is supported for rotation in bearings 104 projecting outwardly from one of the channel members 95. The lower end of the shaft 103, as shown in Fig. 14, carries a gear 105, which meshes with a similar gear 106 carried by a short horizontally extending shaft 107. This shaft terminates outwardly in a universal joint 108 and, as shown in Fig. 3, there is connected to the joint 108 a diagonally extending shaft 109 which leads to a second universal joint 110. From the joint 110 a short shaft 111, which forms a continuation of the shaft 109, leads to the housing 36 of the ware-transferring or take-out mechanism F.

The housing of the mechanism F includes a driven gear 112, the teeth of which mesh with those of a pinion 113 carried by the shaft 111. The gear 112 is driven through the engagement of the teeth thereof with those of another pinion 114, which is carried by a short shaft 115 extending to a universal joint 116. From the joint 116 a shaft 117 extends to the housing 20c, and is equipped within said housing 20c with a pinion 118 meshing with the teeth of the gear 21. By this arrangement the prime mover or motor 15 not only drives the turret table and the mechanism carried thereby, but in addition, through the shaft 117, drives the take-off mechanism F and the shaft 109 of the deposit mechanism D. In this drive the cam 100 is constantly rotated. Since the cam 100 is in contact with the outer end of the spring-held arm 98, continuous oscillatory movement is imparted to the cylinder 97 on which the chute structure of the deposit mechanism is mounted.

The chute structure of the deposit mechanism comprises a receiving trough 120, which is carried by brackets 121 arising from the top of the cylinder 97. The brackets 121 carry a cylinder shown at 122 in which is mounted a sliding piston 123. The piston includes an externally projecting rod 124 on which the receiving trough 120 of the chute structure is carried, the receiving trough being disposed in vertical registry with the outlet O of the glass tank A, so that gathers or gobs g of glass issuing from said outlet, and cut by the usual severing knives or the like 125 into bodies of substantially uniform weight, will be deposited in the trough 120, and thence gravitationally delivered by the pivoted intermediate section of the trough 126 to a deflector and discharge section 127. A reverse scoop 120a is carried by the rod 124 to divert glass from the machine to a suitable point of discharge when deposit of the gobs in the machine molds is undesired.

In this instance the upper end of the intermediate trough section 126 is secured as at 128 on the upper end of the cylinder 97 by brackets 121. The brackets include an extension 129 to which is secured as at 129' the lower portion of the section 126 and an outward extension 130 to the outer end of which is pivoted as at 131 the discharge or deflector section 127. The lower end of the deflector section is pivotally joined as at 132 to the outer member 133 of a telescopic connection shown at 134. The outer member 133 carries a roller 135, which is arranged for travel in the undulating groove or slot 136 formed in a stationary cam bar 137, the latter being carried by and projecting forwardly from the frame members 95.

In view of the foregoing, it will be apparent that as the cylinder 122 is oscillated, first, to the right and then to the left about its vertical axis by the power driven cam 100, corresponding oscillation will be imparted to the sections 126 and 127 of the chute structure. To maintain the outer and lower end of the discharge section 127 in constant registry with the centers of the open tops of the molds during travel of the latter between the positions of full mold closure and clamping and the pressing positions of the plunger mechanism, precise registration is afforded by the telescoping connection 134 which is cam actuated, as indicated at 135 and 136 to swing the chute section 127 about its pivot 131, whereby to maintain its discharge end in registry with the open top of an associated mold through a number of degrees of circular travel of the mold. The fact that the discharge section of the trough follows the mold for a substantial distance provides surety but flexibility in the proper delivery of glass gathers to the molds. Through mechanism hereinafter described, in the event the machinery should fail for any reason, the piston 123 may be actuated to draw the top section 120 of the chute mechanism to one side to bring the reverse scoop 120a into action, so that the flow of glass gobs or gathers may be diverted from the sections 126 and 127 and led to a point of discharge away from the molds. A turning adjustment 127a (Fig. 47) is carried by the outer end of the piston rod 124 to hold the latter in desired rotational positions about its longitudinal axis, whereby to control tilting of the scoop or scoops 120 and 120a. The set screws 127b carried by the brackets 127a may be relatively adjusted to cause the rod 124 to turn about its longitudinal axis and to hold such adjustment.

In order to apply pressure to the molten glass deposited in the forms or molds so that the glass will conform positively to the shape of the walls of the internally located cavities, and thereby form, upon cooling and solidifying of the glass, articles of desired physical form, the upright stationary base-mounted frame structure of the machine, which includes the stanchions or columns disclosed at 7, 27, 28 and 35 and their top struts, is provided adjacent to the top thereof with an upper stationary, circular, plunger-supporting and guiding trackway.

This trackway is designated in general at 140, and as shown particularly in Figs. 28, 35, 36 and 37 the trackway comprises a main horizontally disposed upper level circular track 141, the same consisting in part of a circularly bent angle member. This member receives the upper ends of vertically disposed glass-displacing plungers 143. The upper end of each of these plungers is provided with a cross axle 144, which carries rollers 145 adapted for seating engagement with the horizontal flange of the angle section 141. The trackway 140 is suitably supported by means of the frame constructions 146 suspended from the top struts 33 of the base frame.

To provide for the controlled descent of the plungers 143 into pressing engagement with glass deposited in the mold assemblies, the upper level section 141 of the trackway 140 is provided with a gap 149 (see Fig. 28). Arranged to open and close this gap is a sliding bridge device 150, shown more particularly in Fig. 37. As indicated, this device embodies a pair of spaced angles 150a and 150b united rigidly by sliding shafts 150c mounted in a supporting plate 150d. The oppositely arranged horizontal webs thereof are adapted to be positioned so as to close or open the gap 149. The vertical web of the inner angle member is connected with the outer end of a piston rod 151, the opposite end of this rod containing a piston 152 which is mounted in a fluid pressure cylinder 153. The horizontal web of the outer angle 150b is formed with a cam face 150e by which the plunger rollers are positively advanced in a downward direction when they reach the gap 149, as shown in Fig. 9.

The gap 149 is closed for supporting the plungers in the plane of the upper level by sliding the plate 150a into the gap 149, thereby causing the upper level of the trackway to form a complete ring by which the plunger devices 143 will be maintained constantly elevated during inactive or non-molding operation of the machine.

Normally, the gap 149 is open, so that the rollers 145 pass from the upper level $a$ of the trackway 140 and are positively directed downwardly at a comparatively steep angle along the downwardly inclined guide track section 154 having top and bottom guides, holding the plunger rollers therein. At this inclination region $b$ of the trackway 140, a pair of angles 142 is used for effecting the proper support and guidance of the plunger devices, as shown in Fig. 28. Normally the trackway 140 includes but a single circular angle member 141 arranged on one side of the plunger devices. With the gap 149 open, it will be seen that the rollers 145 will descend from the upper level $a$ of the trackway downwardly along the tracks 154 to the lower horizontal level section 154a of the upper cam-forming trackway.

During the descent to the lower level section 154a of the cam trackway, the lower ends of the plunger devices are caused to enter the mold assembly of the turret table and to apply pressures to the molten glass present in the cavities of such mold assemblies. The plunger devices are maintained in such lowered positions for a given sector in each complete orbit of travel of the molding table to produce the desired formation of various articles. After the displacement of the glass or other moldable material has taken place in the molds, the rollers 145 engage an upwardly inclined section 155 of the cam trackway, causing the plunger devices to be elevated from the lower level to the upper level $a$. At the point of juncture of the upwardly inclined section 155 with the upper track construction 141, the latter is formed with a second gap 156. This gap is normally closed by a gravity operated bridge element 157 which constitutes a continuation of the main section or upper level 141 of the trackway. It is only when the rollers 145 engage the bridge element 157 that the latter is elevated and lifted to a position opening the gap 156, thus allowing the rollers of the plunger devices to be restored to the upper level of the trackway for rotation thereover.

Figure 24:
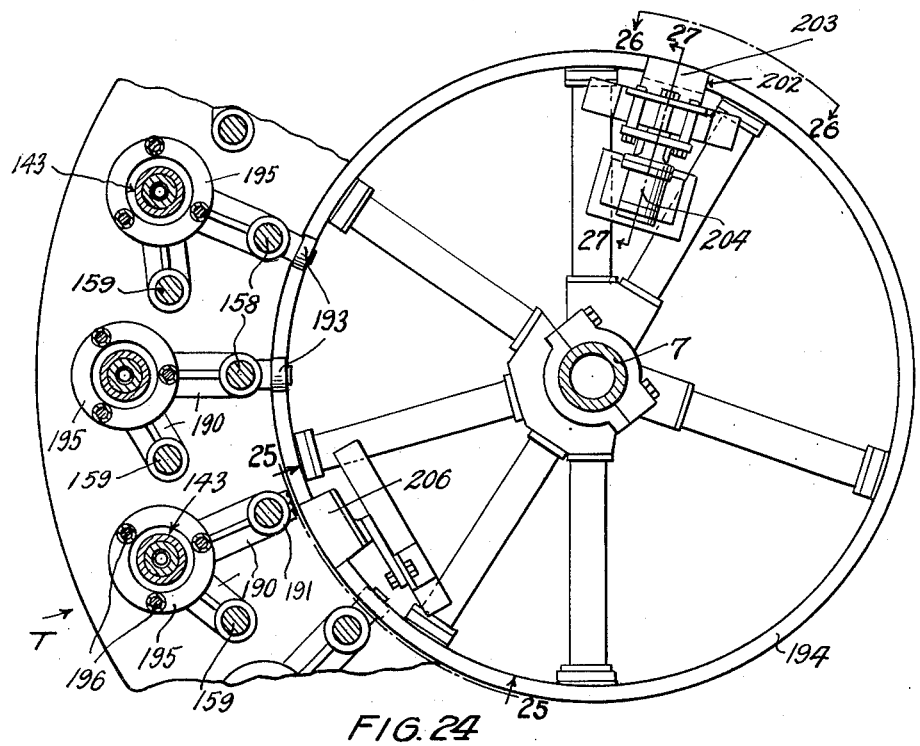
Fig. 24 is a horizontal sectional view taken through a lower plunger-operating ring or trackway of my improved molding machine.
Figure 25:
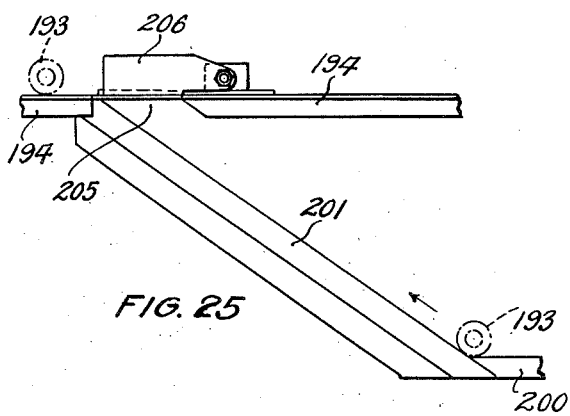
Fig. 25 is a front elevational view showing the trackway from the plane indicated by the line 25—25 of Fig. 24 and showing the ascending section of the lower trackway.
Figure 26:
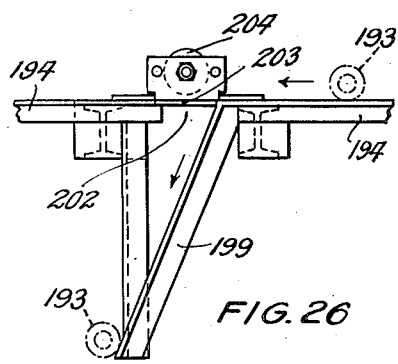
Fig. 26 is a similar view disclosing the plunger-descending portion of the lower trackway, and taken on the plane indicated by the line 26—26 of Fig. 24.
Figure 27:
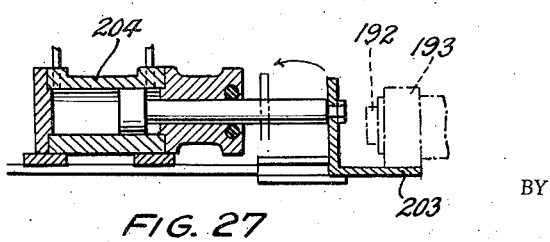
Fig. 27 is a detail longitudinal sectional view taken on the plane indicated by the line 27—27 of Fig. 24, and showing the details of the horizontally shiftable cylinder-actuated track bridge.

Arising from the table 12 at a position adjacent to each of the mold assemblies is a pair of upright rods designated at 158 and 159 in Figs. 7 and 24. These rods have their lower ends shouldered and reduced as indicated at 160 and received in openings 161 formed in the table 12 so that the rods are maintained in secure upright positions in connection with the table to form a substantial and stable frame structure thereon. The upper end of each of the rods 158 and 159 is shouldered and reduced in diameter as indicated at 162 in Fig. 7, the reduced upper end of each of said rods being received in a socket formed in a frame 163 which loosely revolves around the center column 7.

The turret structure (Fig. 7) includes at the top thereof the frame 163 in which is formed a plurality of circumferentially spaced bearings 164 for the slidable reception and guidance of the upper ends of the plunger devices 143.

The plunger devices are each composed of a plurality of united tubular sections and are adjustable in length to secure part registry and alignment in their preferred form. In effecting their adjustment in length the lower end of each upper plunger section 165 is internally threaded as shown in Fig. 7 to receive external threads provided upon each of the intermediate plunger sections, the latter being shown at 167. Lock nuts 168 are threaded on the upper ends of the intermediate sections 167 to engage the under portions of the sections 165 in retaining the threaded telescopic adjustments of each of the plunger devices. A retaining nut 166 prevents rotation of the upper sleeve section following its adjustment. Also, the lower end of each of the upper sections 165 of said devices may be connected with a bracket shown at 169. Each of these brackets is provided with radially extending arms, Figs. 1 and 7, which arms are formed at their inner ends with hubs 170 adapted to be slidably positioned on the upright rods 158 and 159.

At its extreme lower end each of the intermediate sections 167 is externally threaded as at 171 in order to be received within the internal threads provided on a sleeve 172 which is arranged in each of a plurality of lower plug-carrying plunger sections 173.

Figures 43, 44:
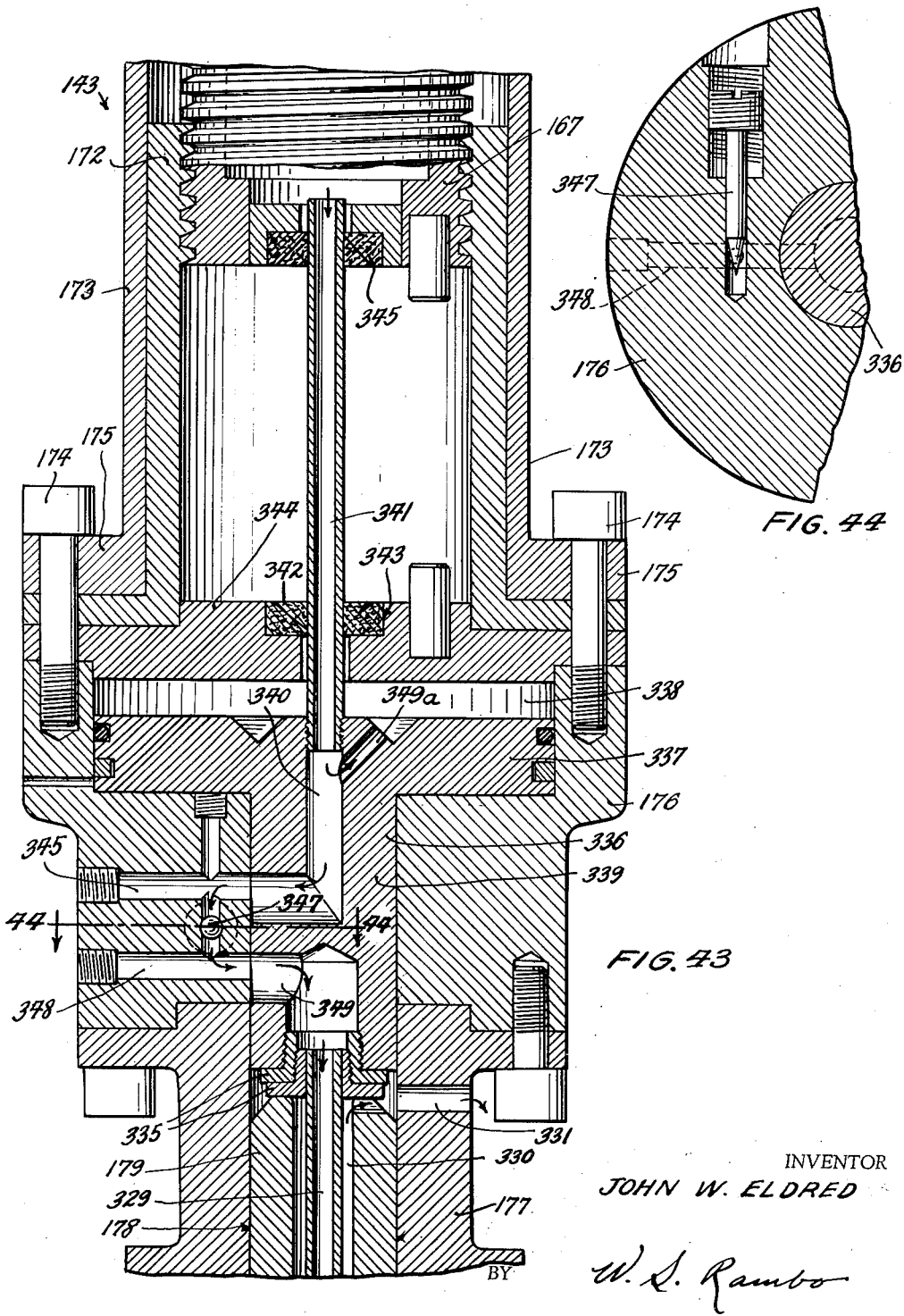
Fig. 43 is an enlarged vertical sectional view taken on the line 43—43 of Fig. 7 and showing one of the cylinder constructions for controlling the operation of the article-forming plungers.
Fig. 44 is a detail horizontal sectional view taken on the plane indicated by the line 44—44 of Fig. 43.

As shown more particularly in Fig. 43, there is attached to the lower end 175 of each of the sections 173, by means of the bolts shown at 174, the flanged upper end of a plunger head 176. Each plunger head comprises an upper section 177 formed with a vertical and axial bore 178 in which is positioned the reduced upper end of a plug 179. The lower end of each of the plugs 179 is formed with an externally threaded diametrically reduced extension 180 which projects below a plunger ring 181, the plug 179 passing through a central opening 182 formed in each ring 181. Each ring 181 is flanged as at 183 and is formed with a depending annular skirt 184, which is adapted to produce an annular groove 185 in the body of the insulator 42 formed in the mold cavity 47, the threaded extension 180 of the plug 179 producing in the insulator body an internally threaded socket 186.

The flanged upper end 183 of each plunger ring 181 is positioned in an annular groove formed in a retaining ring 187 carried by each plunger device, and which ring surrounds the body of the ring 181. The retaining ring is formed with an external annular groove 188 in which is received the horizontal portion 189 of a bracket 190 for each plunger device. Each of the brackets 190 carries a hub structure 191 which is slidable on the rods 158 and 159. The hub is formed with an axle 192 which carries a roller 193, the latter being disposed for contact with a stationary lower trackway ring 194 employed in the support of the plunger devices, as in Figs. 7, 24 and 28.

In addition to its general support for the plunger devices, the construction of the trackway 194 is such that following initial depression of each of the plunger devices, the roller 193 thereof will ride upwardly on a slightly elevated portion 194a of the trackway 194 to elevate the plunger ring 181 associated therewith, so that said ring and its skirt flange 184 will be slightly lifted from the glass body to prevent "freezing" or undesired adherence of the ring surfaces with said body. After such elevation or lifting of the ring, and upon further cooling the glass body, each ring 181 may be restored to its lowered position in contact with the glass body to reform and positively shape the body before the latter is ejected from the machine.

Disposed in contact with the upper surface of the retaining ring 187 for each plunger device is a horizontally directed foot 195, the latter being rigidly connected with the lower ends of vertical, parallel, slidable stems 196. The upper ends of these stems, as shown in Fig. 7, are slidably received in brackets 197 which are slidably mounted on the supporting rods 158 and 159. Coil springs 198 surround the stems 196 and are disposed between the brackets 197 and the foot extensions 195, the springs pressing downwardly on the foot extensions to normally maintain the plunger rings 181 in their lowered positions, except when the same are elevated by the action of the cam ring trackway 194a. Following the lift afforded by the trackway 194a the springs 198 return the plunger rings to their lowered position in the glass bodies, thereby imparting final formation thereto. Normally, the brackets 169, 190 and 197 operate as a unit with the plunger devices 143 in a slidable manner incident to the raising and lowering of said plunger devices.

The lower trackway 194, as shown in Figs. 24 to 28, inclusive, possesses substantially the same features of construction and operation as the ring structure defining the upper trackway shown at 140, and which has been previously described. The lower trackway 194 acts as a supplemental trackway in imparting stable rolling action to the movable plunger devices. As in the case of the upper track construction, the lower track 194 includes a downwardly directed angular extension 199 with which the rollers 193 engage during the descent of the plunger devices. Further, the track 194 is formed with a lower level section 200, as shown in Fig. 28, and the rollers 193 move along the lower level section 200 at the same time the upper rollers 145 travel along the lower level section 154a of the upper trackway. The lower level 200 terminates in an inclined upwardly extending track section 201 by which the rollers 193 are restored to the upper horizontal level of the trackway 194. The downwardly directed section 199 is disposed over a gap 202 which corresponds with the gap 149 in the upper trackway, and which is opened or closed by a bridge plate 203 actuated by a fluid cylinder 204, the latter corresponding to the cylinder 153 of the upper trackway. At the position where the ascending track section 201 merges with the ring 194 a gap 205 is provided which is closed by a gravity-operated track bridge 206, providing for the restoration of the rollers 193 to the upper level of the trackway 194. Additionally, the lower level of the trackway 194 is formed with the locally disposed cam sector 194a by which the brackets 190 are elevated to prevent freezing between the plunger rings 181 and their annular skirts 184 with the molten glass in the mold cavities.

In Fig. 9, there has been disclosed a pressure cylinder mechanism C by means of which fluid pressure may be applied to the plunger devices at the time the same initially reach the lower level section 154a of the upper trackway 140. When the bridge plate 150 is open, as it normally is in the operation of the machine, causing the rollers 145 of the plunger devices 143 to pass through the gap 149 and roll downwardly along the sharply declining guide track 154 to the lower level of the trackway 140, the said rollers 145 are received on an arm 210, the latter being pivoted as at 210' on the trackway 154. Engaged with the rollers 145 of each of their plungers 143 when the same occupies a position of contact with the horizontal extension 211 of the arm 210 is a pressure shoe 212.

This pressure shoe is carried by the lower ends of a plurality of parallel vertical brackets 213 slidable on stationary rods 214. Joined with the upper ends of these brackets is a cross member 215, to which is connected the lower end of a piston rod 216. This rod has slidably mounted thereon a sleeve 217 on which is formed a piston 218, the latter in turn being slidably mounted in a pressure chamber 219 formed in a cylinder 220. The lower head 221 of the cylinder 220 is formed with an air or other fluid-admitting passage 222 by means of which air or the like under pressure may be applied to the bottom of the piston 218 to produce the elevation of its sleeve 217 and concurrently therewith the rods 217a disposed above the cylinder. The upper ends of these rods are joined with a cross bar 217b carrying an adjustable screw 217c. Fastened to the lower end of this screw is the upper end of a coil spring 223. The lower end of this spring is rested on the upper end of rod 216. Also, the cylinder 220 carries an upper head 224, which is formed with air-admitting and discharging passages 225, providing for the controlled inflow and outflow of compressed air or the like, as will be presently explained, in producing downward movement of the piston and its rod 216 and associated pressure shoe 212. This results in applying a downward thrust to each of the plungers 143 at the time the latter reach the lower level b of the trackway 140, assuring positive displacement of the molten glass in the mold assemblies and the positioning of the glass in all portions of the mold cavity. The downward movement of the cross bar 217b, which is rigidly connected with the piston 218 is transmitted in a cushioned manner through the spring 223. This spring is adjustable through the use of the screw 217c to provide variation in the action of the spring, thereby controlling the pressures exerted by the plunger devices on the glass bodies contained in the table molds. It will be noted that when the rollers 145 of the plungers reach the bottom of the inclined section b of the trackway 140, the rollers 145 will engage the foot section 211 of the bracket 210. The lower end of this bracket is pivoted at 211a to the pressure shoe 212 so that the plunger device is supported by the pressure cylinder.

When the plunger devices are forced downwardly by the action of the pressure cylinder, the externally threaded plug extension 180 carried at the lower end of each of said plunger devices is forced into the molten glass or other material to its fullest extent so that the threaded plugs will occupy the position in said glass material as shown in Fig. 7. In this position it will be noted that the plunger ring 181 is forcing downwardly on the glass material, causing it to conform to the irregular configuration of the molding cavities provided in the mold assemblies and the lower part of the plunger head.

In removing the molded articles from the mold assemblies it is necessary to unthread the plug extensions 180 from engagement with the molded glass bodies, particularly after such bodies have received their desired molded configuration. This unthreading or removal of the plug extensions from the glass bodies is effected by the so-called "up-threading" mechanism indicated at G in the drawings, and disclosed more particularly in Figs. 16 through 18.

In these figures it will be noted that the outer ends of the brackets 197 of the plunger devices carry a vertically extending rotatable shaft 227. Each of these shatfs has its upper end equipped with a sprocket 228, and its lower end with an elongated cylindrical gear 229, the teeth of which mesh with gear teeth 229a provided on the upper end of the associated lower section 173 of each plunger device. By rotating the gear 229 corresponding motion is imparted to the section 173 and since the latter is connected with the plunger head 176 at the bottom thereof the said plunger head is rotated. Each plug 179 is formed at its upper end so that it is received within the bore 178 of the plunger head. Further, the upper end of each plug is formed with a keyway 230, in which is positioned the inner end of a spring-pressed key and holding member 231, as shown in Fig. 8. Therefore, the rotation of the section 173, and the conjoint rotation of the heads 176, impart rotary movement to the plug 179 so that the latter may be unthreaded from the socket which it has formed in the molded glass body 42. The keyway 230 is provided in order that the initial rotation of the cylinder 173 will permit the plug to be elevated to a position removed from the glass insulator body before general elevation of the plunger devices takes place. This elevation of the plug 179 takes place while the turret assembly as a whole is rotating about the vertical axis of the machine. The threads shown at 171 and 180 possess the same pitch so that the lifting of the plug by the upthreading action may take place without deforming the glass.

To impart movement to the gear cylinder 229 of each plunger device at the proper stage in the orbital rotation of the turret structure, the mechanism of Figs. 16 to 18 is utilized. The sprocket 228, carried on the upper end of each shaft 227, is, as shown in Fig. 18, arranged to engage with the middle run 232 of an endless chain 233. This chain passes around double-toothed sprockets 234 mounted on a bracket extension 235 through the use of a standard 235a. The lower end of this standard is mounted on a base bracket 235b, stationarily carried by the base of the machine. The sprockets 234 are joined with shafts 236 rotatably mounted in bearings formed in connection with the bracket extension 235.

Mounted on the bracket extension 235 is an electric motor 237. The armature shaft of this motor, as shown in Fig. 17, carries a pulley wheel 238 around which passes an endless belt 239, the latter being trained over a pulley 240 fixed to the lower end of a stud shaft 241. Also, mounted on the stud shaft is a second pulley 242, around which passes a belt 243, the latter extending to a belt wheel 244 carried on a short stud shaft 245 rigidly depending from the under side of the bracket extension 235. The stud shaft is equipped with a pinion 246 which meshes with a gear 247 provided on the sprocket carrying shaft 236, the latter being journaled in a bearing provided therefor in the bracket extension 235. The upper end of the shaft 236 is equipped with the sprocket 234 with which the chain 233 contacts. The chain also passes around sprockets 250 and 251 mounted on the bracket extension 235, the arrangement of the chain 233 being such as to rotate the cylinder gear 229 through its sprockets 228. A spring take-up 233' is provided for removing slack from chain 233.

The upthreading mechanism thus removes the threaded extensions of the plunger devices from engagement with the molded glass bodies in the mold assemblies. It will be noted that the mold table 12 is rotated in a clockwise direction, and the chain 233, as shown in Fig. 16, has its length between the sprockets 234 and 250 moving in the same direction. Therefore, in order to cause the plunger devices to unthread, it is necessary for the chain 233 to move at a greater rate of linear speed than the mold table, hence the use of the drive motor 237.

After the operation of the upthreading mechanism has been completed with sustained rotary movement of the mold table or turret structure, the mold assemblies are opened, as shown in Fig. 6, so that the ejector mechanism 45 may be actuated to lift the formed insulator bodies from the mold cavities and transfer the molded bodies to a position of discharge. Such a position advantageously may be a conveyor 45a for moving the formed bodies either to an annealing lehr, not shown, or to a point of packaging for commercial shipping.

The ejector includes for each mold the depending tubular body 45, which passes through the guide hub 52 of each mold plate 50, and the lower end of each of the bodies 45 is formed with a roller 261, which is adapted to engage with a shoe extension 262, the latter being fixed on a stem 263 which arises from a fluid pressure-actuated cylinder 264.

This cylinder is mounted on the base B of the machine and includes an internal chamber in which is slidably mounted a piston 265 joined with the lower end of the stem 263. Through suitable controlling valve mechanism hereinafter defined air or the like under pressure may be introduced into the cylinder 264 to raise or lower the piston 265 therein so that the head 46 of the ejector may be moved from the full line position to the dotted line position of Fig. 19, in which the molded insulator body is disposed as extending above the mold structure. It will be understood that the plunger devices at this time have been raised by the upper and lower trackways so that the lower ends of such plunger devices are out of the way and do not interfere with the elevation of the ejector. A swinging frame 263a is pivoted on the table 38 as at 264a. The frame carries an inclined guide track 264b at its upper end which registers with the shoe 262 when the latter is elevated. The track 264b thus provides for a gradual and controlled descent of the ejector sleeve 45 to prevent injury thereto during its seating. This allows the piston 265 to descend rapidly. A spring 264c is employed to maintain the frame 263a in an upright position. A set screw 264d provides adjustment for limiting upward swinging movement of the frame 263a.

The cylinder 264 is provided with an upstanding guide rod 266, and an arm 267 projects from the stem 263 and carries an upstanding stud 268 with which a lug 269 on the sleeve extension 262 engages. A spring 270 maintains the lug 269 in contact with the stud 268 to hold the shoe 262 in its normal or operating position. However, if the shoe is engaged accidentally by some moving part, the spring provides release in that the shoe may turn about the axis of the stem or rod 263 on the upper end of which the shoe or cam 262 is turnably mounted. Likewise the frame 263a is provided with similar relief through the action of the spring 264c. One end of the spring 270 is connected with a crank arm 271 which projects outwardly and rigidly from the stem 263, while the other end of the spring is fastened to a short crank extension 272 which is carried by the arm on which the sleeve 262 is supported.

A valve mechanism 273 is carried by the base B for controlling the delivery of air or the like under pressure to the cylinder 264 through the lines 267. The valve is actuated by a rotary cam or eccentric shown at 274. The cam 274 is carried by the shaft 115 so that the valve mechanism 273 may be tripped at proper intervals to admit air into the bottom of the cylinder 264 in order to force the piston therein upwardly and to elevate the slidable lifting member or ejector plunger 45.

The operation of this lifting member or ejector is timed so that when the member or ejector reaches its maximum elevation the molded piece 42 will be elevated above the plane of the mold structure in which it was formed and gripped by the revolving jaws 280 of the take-out mechanism F. This take-out mechanism has been set forth in my prior Patent No. 2,415,997, dated Feb. 18, 1947, and while the same may be used advantageously in connection with the automatic molding machine of the present invention, nevertheless, said take-out mechanism does not form a part per se of the present invention. As illustrated, the transfer mechanism comprises a head 281 which is driven by a vertical shaft 282 carrying at its lower end the gear 112, the latter, in turn, being driven by the prime mover 15. As the head 281 of the transfer mechanism revolves, the jaws 280 thereof have their outer ends centered over the vertical axis of each of the mold assemblies, with the jaws 280 in their opened positions. When the bodies 42 are elevated, the jaws 280 close and receive the molded bodies in the region of the annular grooves 56 therein.

The transfer mechanism continues its rotation in timed relationship with the rotation of the mold table until the ware reaches a discharge position. Prior to this time the article is inverted as shown in Fig. 5. At this time the jaws of the take-out mechanism open to release the ware and deposit the same on the conveyor 45a or other transferring device. As stated, a discharge conveyor may be used advantageously to conduct the finished ware to a lehr or other heat-treating zone, or to convey the finished ware, if it requires no further heat treatment, to a point of assembly and packing.

Figure 32:
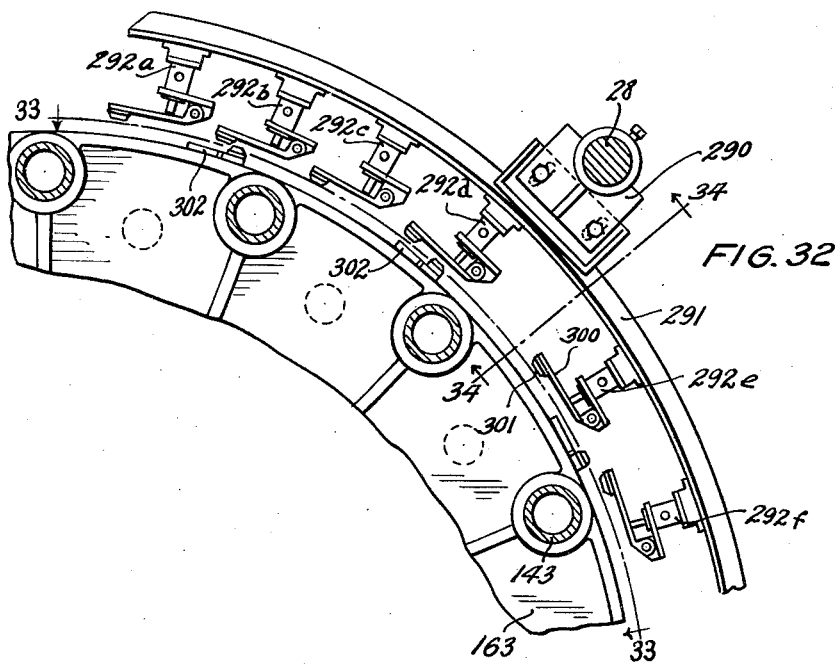
Fig. 32 is a fragmentary plan view, partially in horizontal section, and disclosing the turret-actuated control valves for governing the automatic operation of the various interdependent mechanisms of the complete molding machine.

Mounted on the stanchion 28 of the base of the machine is a bracket structure 290. This bracket structure is employed to support an arcuate rail 291 in a manner holding the rail stationary, the rail being of arcuate configuration and arranged concentrically with respect to the revolving turret. Mounted on the inner face of the rail 291 as shown in Fig. 32, are a plurality of trip valves 292. Each of these trip valves is of the construction disclosed in Fig. 40, the same involving an internal chamber 293 in which is slidably mounted a valve piston 294 having an annular groove 295 formed in its body. Movement of the piston valve is resisted by a coil spring shown at 296. Air under pressure may enter each valve through the outlet pipe line 298. The sliding valve member 294 includes an outwardly projecting stem 299 arranged exteriorly of the valve body. Pivotally mounted on the exterior of each of these valve bodies is a pivoted actuating arm 300, and one end of the arm is formed with a headed actuating extremity 301.

In this instance the trip valve shown at 292a is employed to govern the operating positions of the receiving section 120 of the deposit mechanism D. When the valve 292 is actuated, as will be presently explained, the receiving section 120 may be moved through the operation of the piston 123 and the cylinder 122 to a position out of registry with the intermediate section 126 of the deposit mechanism chute structure, thereby diverting the flow of glass gathers from the furnace A to a point of discharge removed from the molding machine proper through the reverse chute 120a.

Figure 33:
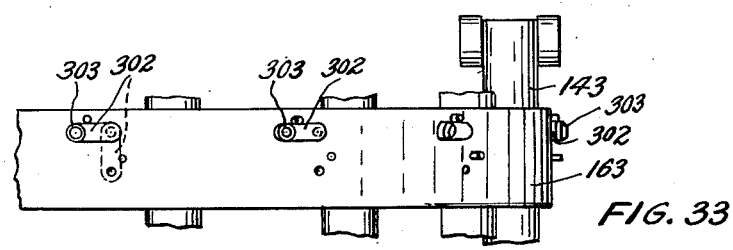
Fig. 33 is a fragmentary front elevational view disclosing the turret-carried actuating control trips, the plane of the figure being indicated by the line 33—33 of Fig. 32.
Figure 34:
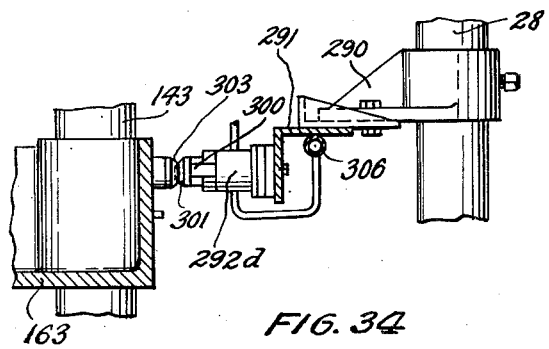
Fig. 34 is a vertical transverse horizontal sectional view on the plane disclosed by the line 34—34 of Fig. 32.

In the actuation of the valve or valves 292, the frame 163 carries on the exterior thereof pivotally movable trip devices 302. These trip devices may be maintained in the elevated inactive positions disclosed in full lines in Fig. 33, or moved to assume their active tripping positions shown by dotted lines in Fig. 33. When in their active and lowered positions the ends 303 of the trip devices are in position to engage the headed ends 301 of the valve-actuating arms 300. This contact takes place automatically as the turret structure revolves. In this instance the trip devices have been shown as being manually operated.

As previously stated, the valve 292a, when actuated by contact with its associated trip device 302, is moved so that the piston 294 therein has its groove 295 registered with the pipes shown at 298 and 297. By reference to Fig. 38, it will be observed that a pressure tank 304 is provided for the reception of air or other fluid under pressure. Leading from this tank is a pipe line 305, which extends to a manifold pipe 306 mounted on the rail 291. With the valve member 294 in a position in which its groove 295 registers with the pipes 297 and 298 air will pass from the manifold pipe line 306 through the valve 292a and thence into the line 298 which extends to one end of the cylinder valve 307.

This valve is formed with an internal chamber 308 in which is slidably mounted a spool-type valve 309 having annular grooves 310 and 311. When air passes through the valve 292a the same is conducted by way of the pipe line 298 to one end of the cylindrical valve 307. This valve has been illustrated in Fig. 39. The admittance of air into the left side of the chamber 308, as the structure is viewed in Fig. 39, causes the spool valve 309 therein to travel to the right, thereby registering the groove 310 with an air inlet pipe 312, which extends to the valve 307 from the pressure tank 304. The passage of air through the groove 310 causes the air to pass through a pipe 313, which leads to one side of the cylinder 122, thereby forcing the piston 123 inwardly to the left, as viewed in Fig. 38, so that the chute 120 will be withdrawn from registry with the chute section 126.

As the turret structure continues to revolve the trip device 302 is removed from contact with the valve 292a and is caused to contact the back arm 300 of the valve shown at 292b. This valve is a duplicate structure of the valve 292a, and the outlet pipe 314 leading therefrom extends to the opposite end of the valve cylinder 307 with respect to that engaged by the pipe 298, so that air will enter the chamber 308 and force the piston 309 toward the left, thereby bringing its groove 311 into registry with the air pipe 312 and also with a discharge pipe 315 which leads to the cylinder 122 at the end of the latter opposite to that engaged by the pipe 313, thereby restoring the chute 120 to its active gather advancing position in registry with the machine molds.

Similar valves 292c and 292d are provided for controlling the operating positions of the slidable bridge plates 150 and 202 of the upper and lower trackways 140 and 194, respectively, employed in the raising and lowering of the plunger devices. Also, corresponding valves are employed, as shown at 292e and 292f for governing the operation of the press cylinder 220. In Fig. 38, the cylinder 153 controlling the operation of the bridge plate 150 and the cylinder 204 for controlling the operation of the bridge plate 203 of the lower trackway have been diagrammatically set forth. Air is admitted to the cylinders 153 and 204 through a spool valve 316, which corresponds in construction and operation to the spool valve 307. It will be seen that when the valve 292c is tripped by the action of one of the devices 302, compressed air will pass from the manifold 306 through the valve 292c and thence by way of a pipe line 317 to a normally opened manually operated valve 318, traveling from the valve 318 by way of a pipe line 319 to one end of the spool valve 316. This results in moving the valve member in the valve 316 in a direction permitting air to flow from pressure tank 34 through a pipe line 320, thence through the valve 316 and to one side or the other of the cylinders 153 and 204, thereby moving their associated shutter plates 150 and 203 to open or close the trackway gaps.

Likewise, when the valve 292d is tripped, the valve member in the control valve 316 is shifted in position so that the pistons in the cylinders 153 and 204 will travel in the opposite direction to that produced by the opening of the valve 292c, thereby actuating the bridge plates 150 and 203 as desired.

The valve 292e receives air from the manifold 306 and when the same is tripped to assume an open position, by the cooperation of one of the trip members 302, the air passes through the valve 292e to a sliding control valve 321, the latter being joined with the pressure tank 304 by a pipe line 322. Depending upon the position of the valve member in the valve 321, air will be conducted by the pipe line shown at 322 to the press cylinder 220, raising or lowering the piston therein depending upon which of the valves 292e and 292f is actuated.

After the ware has been removed from the machine by the actuation of the rotary transfer mechanism F, and while the mold jaws are still in their open position, the said open jaws move into registry with a "down-threading" mechanism disclosed at E. By the operation of the "up-threading" mechanism G previously described, it will be observed that the threaded plugs 159 of the plunger devices are elevated to remove their threaded lower ends 180 from contact with the ware. Therefore, in order to restore these threaded lower ends to molding positions, it is necessary that the same be forced downwardly. This downward movement of the threaded plugs is accomplished by the mechanism E, which is the same in all respects as the up-threading mechanism G, with the exception that the endless belt or chain 233a is moved in the opposite direction from the travel of the belt 233.

As shown in Fig. 5, the base B of the machine, below the turret table 12 may be provided with a circular hollow casing 325 into which air under pressure may be introduced for part-cooling purposes. In this regard air is supplied under pressure to the casing 325 by a blower or other source, not shown, located exteriorly of the casing. The upper portion of the casing 325 is closed by a ported wall 326 carrying thereon a ring 327 which rotates in unison with the table 12. The ring has connected therewith a plurality of nozzle extensions 328. The lower end of each extension is disposed for registry with the openings in the wall 326, so that air under pressure may be forced through the nozzle extensions and delivered to various parts of the machine, such as the molds, for the purpose of cooling the same or regulating their working temperatures.

If desired, compressed air may be supplied to the plugs 179 for cooling purposes. This may be accomplished by introducing compressed air into the upper end of column 7, as at 7a, and thereafter withdrawing compressed air from the column 7 by way of the ported rotating ring 179a and delivering the same to a turret-carried manifold 179b. From this manifold the compressed air flows through flexible tubes and into the hollow interiors of the plunger devices 143. The air travels downwardly and, as shown in Figs. 8 and 43, descends through a vertical tube 329 into the hollow interior of each of the threaded extensions 180, then passing upwardly through a bore 330 and finding outlet to the atmosphere through the vent 331.

If desired, the base extension 25 may be provided, as shown in Fig. 5, with a bracket 332 on which is adjustably mounted in a vertically movable clevis 333 a roller 334. The roller 334 is disposed in engagement with the under surface of the table 12 contiguous to its outer periphery at the point where the table registers with the press cylinder mechanism C, so that as pressure is applied by said cylinder to the articles undergoing molding, the stresses and strains are absorbed in large part by the base supported rollers, and the machine thereby braced and strengthened.

In compensating for variation in the volume or weight of the individual glass gobs or gathers delivered by the deposit mechanism to the successive molds, it will be noted, by reference to Figs. 7, 8 and 43, that the plugs 179 are free to move upwardly to a limited degree in the bores 178 when the amount of glass in the forming cavities 47 is greater than normal. This is done in order to prevent the glass when pressed by the plungers into the mold cavities from squeezing through the ring seats and thereby producing imperfect ware. With the present construction, when there is present in a mold cavity an excessive quantity of glass, the final pressures produced will cause limited rising movement on the part of the plugs 179 and their threaded extensions 180, thus relieving the glass undergoing molding of undue pressure.

The pipes 329, which extend into the hollow bores 330 of the plugs 179, have their upper ends connected with and suspended from threaded nipples 335 which are carried by the lower end of each of a plurality of piston elements 336, as shown in Fig. 43. Each of these piston elements embodies a head 337 which is slidable in a chamber 338 formed in the body of each plunger member 176. Formed with and depending from the head 337 of each piston element is a rigid stem or rod 339. Each rod is formed with an L shaped passage 340 for the travel of compressed air or other fluid under pressure. The upper end of each of the passages 340 is threadedly connected with the lower end of an air-conducting tube 341 which moves in unison with its associated piston element and plug in response to pressures developed in the molding of glass articles in the mold cavities and air pressures created in the chamber 338. Each tube passes through a packing 342 provided in a bore 343 formed in an associated divider wall 344 of each plunger casing 173. Likewise, each sleeve 172 has its associated intermediate plunger section 167 formed with a packing-containing collar 345 through which the upper end of its tube 341 extends.

Air under pressure, delivered to the top of each plunger barrel from the column 7 and associated manifolds, passes downwardly through each of said barrels and the tube 341, and flows through the passage 340 in each piston element 336. As shown in Fig. 43, the lower end of each passage 340 terminates in a horizontal extension which registers with a bore 345 provided in the barrel of each plunger 176. Each of the bores 345 communicates with a restricted port 346, and the flow of compressed air through each of these ports is regulated by an adjustable needle valve 347. Compressed air which passes around each of the valves 347 enters a bore 348 formed in each plunger 176 in parallel order with the bores 345. The outlet end of each bore 348 communicates with an L shaped opening 349 provided in the rod extension 339 of each piston element 336, and with the open upper end of each tube 329, so that air, or other cooling fluid, may pass downwardly through the tubes 329 to cool the threaded glass-contacting extensions 180 of the plugs 179, as above defined. It will be noted that the passages 340 and 349 of each piston element rod are formed to possess a greater diameter than those of the bores 345 and 348 so that constant registry will be had between the same in all working positions of the piston elements.

The bore or passage 340 of each piston element is formed with a diagonal port 349a which establishes air flow communication with its associated piston chamber 338, maintaining air or other fluid therein under pressure in order that the same will yieldably resist upward movement of the plugs 179 and the piston elements associated therewith in the application of forming pressures to the glassware undergoing molding. The needle valves 347 merely admit sufficient air to pass through the plugs 179 for cooling purposes, but do not lower air pressure to any sensible extent in the chambers 338. Thus, with the use of this construction, variations in gob volume or weight are readily compensated for and truly and accurately formed products produced therefrom.

As shown in Figs. 1, 2 and 45, immediately following the pressing of the plungers by the action of the pressing head C, and preceding the up-threading mechanism G, is a shiftable sector gear mechanism W which is utlized for the purpose of imparting relatively slight rotation to the plunger sleeves 173 for the purpose of breaking undue adhesion between the contacting surfaces of the exteriorly threaded plug extensions 180 and the hot glass in engagement therewith, whereby to enable the up-threading mechanism G to operate quickly and without the difficulty presented by sticking parts.

The mechanism W, in the form thereof illustrated in Fig. 45, comprises an arm 350 which is pivotally mounted as at 351 on a stationary bracket 352 carried by the frame rod 27 which arises from the base B. The arm 350 at its inner end is formed with a gear sector 353 which, when the arm is serving to occupy its active position, is disposed for engagement with the teeth of the cylinder gears 229 is sufficient to slightly rotate the plug extensions 180 and break binding adherence of the extension with the hot molded glass. The bracket 352 preferably has mounted thereon a fluid cylinder 354 containing a sliding piston having an exterior projecting rod which is pivotally joined as at 355 with the slotted outer end 356 of the lever arm 350. By admitting compressed air selectively into one end or the other of the piston-containing chamber of the cylinder 354, through the operation of any suitable valve mechanism, not shown, the operating positions of the gear sector arm 350 may be readily controlled.

While the operation of the machine has been referred to at different stages in the above description, nevertheless, the entire operation of the machine may be summarized as follows:

The table or turret structure T is supported on the base B for turning movement about the vertical axis provided by the upright standard or column 7. Continuous rotary motion is applied to the table or turret structure by the electric motor 15, or other equivalent prime mover, and the power-transmitting gearing contained in the housings shown at 18 and 29. The table has positioned thereon the molds M, each mold being formed with the pivotally united jaws 54 capable of being turned about the vertical pivots, represented by the pins 59, in assuming opened and closed positions. Such movement on the part of the mold jaws is obtained by the employment of the pivotal linkage shown at 60, 61, 62 and 63. The parts 63 include the inwardly and radially extending shanks 64 which are slidable in the guides 65 carried by the table. The inner ends of the shanks have engagement with the stationary cams 71 and 73 so that the jaw linkage is operated during a certain sector in each cycle of table rotation to maintain the jaws closed, or substantially closed, while in another sector of the rotational cycle of the table the molds are open, that is, the jaws of each mold are separated.

Immediately following closure of the jaws to form a cavity therein capable of containing molten glass, a gather or gob of such glass is deposited in the closed molds by the operation of the deposit mechanism D. This mechanism involves the chute structure represented by the receiving trough 120, the registering lower and intermediate section 126 and the bottom discharge section 127. The receiving section 120 is located below the gather-forming means shown at A, O, and 125 in Fig. 13 of the drawings, so that gathers or gobs of molten molding material will drop from the forming means and be conducted gravitationally by the chute structure of the deposit mechanism to the cavities of the molds M.

It will be noted that the chute structure oscillates bodily about a vertical axis arising from the machine base B adjacent to the outer circumferential edge of the table. Therefore the arcs of table rotation and chute oscillation are opposed. Since the table rotates constantly it is necessary to compensate for these opposed arcs of turning movement, so that the glass gathers may be discharged from the deposit mechanism into the molds, and with the operation performed within an arc represented by a few degrees of turning movement of the table. This result is secured by the sliding motion imparted radially to the chute discharge section by the cam guide 136 while said section is swinging about the vertical axis of the cylinder 97, the shape of the guide 136 being such as to maintain the discharge end of the chute section 127 directly over the center of the molds during the full oscillating stroke in one direction of the chute structure. By the operation of the fluid-actuated means represented by the cylinder 122 and piston 123 the receiving section 120 of the chute structure may be bodily moved to divert the flow of molding material away from the machine when such diversion may be found necessary.

Immediately before the operation of depositing heated molding gathers in the molds, the jaws of the latter are not only moved together to assume a position of closure, as effected by the linkage and cam mechanism 61, 63, 71 and 73 shown in Fig. 6, but in addition are positively held in their positions of full closure by the operation of the clamping rolls 82. The latter are carried by the inner ends of the stems 80 which are guided by the sliding blocks 77 confined for movement in radial guides on the circumferential portion of the table 12. The rolls 82 are, by the engagement of the block-carried rollers 85 contacting the arcuate rail 87, caused to impart wedging contact with the lips 75 on the outer ends of the mold jaws, thereby positively holding the jaws together and preventing their separation during the period of table rotation wherein the glass gathers are deposited in the molds and during the period immediately thereafter in which the molding gathers or materials are pressed while in the mold by the table-carried vertically reciprocating plunger devices 143 in causing said material to assume desired molded formations.

The plunger devices 143 are supported by the frame structure 158, 159 and 163 mounted on the continuously rotating mold table 12 and form component parts of the turret structure T. Each mold on the table 12 has arranged above and in vertical registry therewith one of said plunger devices. As the table rotates the plunger devices move up and down at definite periods in each complete cycle of rotation of the table. Such vertical movement of the plunger devices causes the heads 180 formed on their lower ends, including the head rings 181, to be brought into engagement with the molten material to shape the same into product or article formations.

The timed raising and lowering of the plunger devices, in bringing the same into and out of forming engagement with the heated molding material disposed in the mold cavities 47, is effected by the provision of the upper and lower trackways shown at 140 and 194, respectively, in Fig. 28. The upper end of each plunger device carries the roller means 145 which, with the rotation of the turret T, ride over the upper surfaces of the top level a of the trackway 140 and, also, the roller means 193 at the lower end of each plunger device rides over the upper ring surfaces of the lower trackway 194. In the normal operation of the machine the gaps or spaces 149 and 202 of the trackways are open, that is, the movable bridge plates 150 and 203 are so disposed relative to the trackways that the plunger device rollers 145 and 193 will be positively directed downwardly through the gaps to cause the same to descend along the downwardly inclined sections b and 199 of the trackway, so that the rollers will travel on the lower level rails 154a of the upper trackway and 194a and 200 of the lower trackway. This causes the lowering of the plunger devices so that their article-forming heads will be brought into shaping contact with the mold-held glass.

Of particular importance in the operation of the machine is the fact that when each of the rollers 145 of the plunger devices arrives at the bottom of the track section b, the same will be arranged on the pivoted lever foot 211 of the lever arm 210. This arm is supported at its lower end on the pressing head 212 of the pressure cylinder C. When the piston 218 of the cylinder C is forced downwardly, the head 212 serves to apply positive downwardly directed force to the associated plunger device, whereby to cause the shaping head and ring on the lower end of the plunger device to displace the molding material effectively within the limits of the mold cavity. The head 212 is of such length as to maintain contact with a plunger roller 145 during the operation of the pressure cylinder C thereon with sustained rotation of the table. The plunger devices are maintained in their lowered position of mold engagement by movement of the rollers 150 and 204 over the lower level tracks of the upper and lower trackways. It will be noted that the lower level tracks are interrupted where the same are in alignment with the pressure cylinder C, so that gaps i and j are formed to allow the plunger devices to be free from supporting engagement with the trackways and to respond freely to the pressures applied thereto by the pressure cylinder mechanism C.

After this pressing operation the rollers of the plunger devices engage the lower level tracks of said trackways. The track 194a of the lower trackway 194 is raised to slightly lift the plungers traveling thereover to remove each head ring 181 and its skirt 184 from the glass sufficiently to prevent undue sticking or adherence of the rings with the heated glass. The track 194a then terminates in a gap k which allows the rings 181 to drop into the mold to again shape the ware but without likelihood of sticking parts when the formed ware is to be removed from the machine.

The lower levels terminate in the upwardly inclined track sections 155 and 201 by which the plunger devices are raised from the low level of each trackway to the upper level thereof. This upward movement of the plunger devices removes their headed lower ends from engagement with the molds so that the latter may be opened and the formed ware removed therefrom. By moving the bridge plates 150 and 203 to close the upper level track gaps 149 and 202 the plunger devices will turn with the turret structure without rising or falling, providing an inactive stage of operation.

In the formation of the telephone pole insulators 42, the threaded sockets 186 are produced by the sinking of the threaded plug extremities of the plunger devices into the formative molding material by the action of the pressure cylinder mechanism C. After the molding formation has been thus effected, it becomes necessary to remove the threaded extensions 180 of the plugs 179 from the sockets 186 formed thereby in the molded bodies. Such removal is performed automatically during the sustained rotation of the mold turret by the up-threading mechanism G. Also, by the use of sector gear mechanism W of Fig. 45 initial release of the threaded plug extensions 180 from the hot glass is effected. Compensation for variations in volume of the glass deposits in the molds is effected by the relief mechanism depicted in Fig. 43.

The mechanism G includes the motor-actuated chain 233. The inner run of this chain is of such length that the sprockets 228 engaged therewith will be revolved sufficiently while said sprockets are traversing the chain to rotate the cylinder gears 229 and the associated lower sections 173 of the plunger devices to cause said sections 173 to be elevated through the action of the screw threads 172, lifting with them the heads 176 and the plugs or stems 179. This action continues until the plug extensions 180 are removed completely from the threaded sockets 186 formed thereby in the insulator bodies 42. This action results in disconnecting the lower ends of the plungers from the molded materials so that the plungers will be free upon engagement of the rollers 145 and 193 with the upwardly inclined track sections 155 and 201 to assume completely elevated positions spaced from the molds.

Following the up-threading operation and the elevation of the plunger assemblies, the mold table in its continuous rotation arrives at the ejector position. At this time the ejector is elevated by contact with the roller-carrying shoe 262 of the piston-actuated plunger 263. The movement of the plunger-operating piston 265 is controlled by a cam actuated valve means driven by the power shaft 117.

When the ware is elevated above the plane of the mold assemblies, the continuously operating transfer mechanism F functions to remove the ware from the ejector and to deposit the ware on a discharge conveyor or the like. After the ware has been removed, the further advance of the table brings the down-threading mechanism 233a into action, causing the descent of the plunger heads 176 and the plug extensions 180 while the plunger assemblies are supported by the upper levels of the trackways 140 and 194, so that said heads and extensions will be in proper positions to engage the molten mold-held material when the said plunger assemblies are again lowered by the downwardly inclined sections of the trackways.

The machine is thus characterized by its continuous automatic operation and high output capacity for producing accurately formed molded articles. The machine may have its operation impact controlled manually by the main controlling switch, not shown, for the operating circuit of the motor 15, or by operation of the clutch 23.

Additional controls are provided by the actuation of the trip levers 302 which may be manually positioned to operate when desired any one of the valves shown at 292a to 292f in governing the operation of the chute 120 of the deposit mechanism D, or the bridge plates 150 and 203 of the trackways, as in moving said bridge plates to positions confining the rollers 145 and 193 to travel on the upper levels of the trackways 140 and 194, or in controlling the operation of the pressing cylinder mechanism C, as previously set forth. The machine readily lends itself to the employment thereon of forced air circulation to the heated parts of the machine, such as the mold assemblies and plunger devices. This cooling is produced by the use of the container 325 and associated nozzle and delivery lines for conducting cooling air or other fluids, and directing the same on the heated machine parts, whereby to maintain such parts well within safe operating temperatures.

I claim:

1. In a molding machine; a vertical plunger structure embodying an upper section and a depending, coaxial, tubular relatively rotatable, lower section; means supporting said structure at the upper end thereof; means cooperative with said lower section and independent of said supporting means to raise and lower the lower section relative to said upper section; a plug member mounted for rotation in unison with and for limited vertical sliding movement in said lower section, said plug member at its lower end, normally projecting below the adjacent end of said lower section a predetermined extent; and means carried in said lower section for applying a working fluid under pressure to said plug member to yieldably maintain the latter in its normally projecting position with respect to said lower section.

2. In a molding machine; a vertically mounted lower plunger section formed with an internally disposed axial bore and a communicating piston chamber; a plug member including a cylindrical body mounted for limited sliding movement in said bore, said member being formed with a piston head positioned in said chamber and having an exteriorly threaded lower end projecting below the corresponding end of the plunger section for mold entry; passage means in said plunger section for maintaining a compressible fluid under pressure in said chamber and in engagement with the head of said plug member, whereby to maintain the lower end of said member normally in its projected position relative to the plunger section; a support; an upper plunger section carried by said support and having threaded engagement with said lower section; and interengaging power-actuated means carried by said plunger sections for applying rotative movement to said lower section to turn the same about its threaded connection with the upper section in imparting bodily raising and lowering movement to the lower section and plug member carried thereby relative to said upper section and its associated support.

3. Plunger means for molding machines as defined in and by claim 2, and wherein said plug member is formed with axially disposed longitudinally extending passages, the latter communicating with the passage means in said lower plunger section for the travel of said fluid as a temperature-controlling medium through the plug member.

4. In a molding machine; a tubular lower plunger section; an upper plunger section; threaded means uniting said sections; means connected with said upper section and supporting said sections and said threaded means in generally vertically arranged order, said lower section being rotatable on said threaded means and movable between relatively raised and lowered positions with respect to said upper section; a gear carried by said lower section; power-actuated gear means engaging the gear carried by said lower section and operable to rotate said lower section on said threaded means to impart longitudinal raising and lowering movement thereto relative to said upper section; said lower section being formed with an axial bore; a plug assembly including a body stem slidably mounted in the bore of said lower section and a lower externally threaded portion projecting axially outwardly from the lower end of said lower section; and pressure-applying means positioned in said lower plunger section and engaging said stem for yieldably holding the latter in a downwardly extended position with respect to said lower plunger section.

5. In a molding machine; a vertically disposed lower plunger section; threaded supporting means engaged with the upper part of said section; means for rotating said section to impart raising and lowering movement thereto on said threaded supporting means; a plug member slidably mounted for limited movement in an axial bore formed in said section and rotatable in unison therewith, said member including an externally threaded mold-entering extension on the lower end thereof, said extension being disposed normally below said section; and pressure-applying means positioned in said section for urging said plug member and the threaded extension thereof toward a lowered position of mold entry.

6. A plunger section for molding machines as defined in and by claim 5, and wherein said pressure-applying means is fluid operated.

7. Plunger mechanism for glass article-molding machines, comprising: an upper section and a depending coaxially disposed lower section; supporting means for said upper section; a threaded union uniting the lower section for rotational and longitudinal adjustment on said upper section; said lower section being formed with an axial bore; a plug member mounted in said bore for limited movement longitudinally thereof and for rotation in unison with said lower section; said plug member at its lower end projecting beyond the corresponding end of said lower section and being formed with an externally threaded extension; and yieldable pressure-applying means formed in said lower section, said last-named means serving normally to maintain the plug member in an extreme lowered position but admitting of raising movement on the part of said plug member in response to variations in volume of molding mtaerial into which the threaded extension of the plug is forced by said pressure-applying means.

8. Plunger mechanism as defined in and by claim 7, and wherein the bore of said lower section includes at the upper part thereof a piston chamber forming a part of said pressure-applying means; a piston slidably mounted in said chamber; said piston including a rigid depending stem arranged in said bore for engagement with the upper portion of said plug member; and means for maintaining a gaseous fluid under pressure in said chamber.

9. Plunger mechanism as defined in and by claim 7, and wherein the bore of said lower section includes at the upper part thereof a piston chamber forming a part of said pressure-applying means; a piston slidably mounted in said chamber; said piston including a rigid depending stem arranged in said bore for engagement with the upper portion of said plug member; means for maintaining a gaseous fluid under pressure in said chamber, and valve-controlled passage means for conducting said fluid in part from said chamber and passing the same longitudinally through said plug member for modifying the operating temperatures of the latter.

10. Plunger mechanism as defined in and by claim 7, and wherein the portion of said plug member positioned in the bore of said lower section is formed with a longitudinal recess; and a spring-pressed key carried by said lower section occupying said recess to produce rotation of the plug member in unison with said lower section in all positions of sliding movement of the plug member in said bore.

11. In a molding machine; a supporting structure; a plunger assembly carried by said supporting structure and embodying tubular, coaxially disposed, upper, intermediate and lower sections; a threaded union adjustably uniting adjoining portions of said upper and intermediate sections for varying the effective length of the plunger assembly; additional threaded connecting means uniting contiguous portions of said intermediate section with said lower section; said additional connecting means providing for raising and lowering of the lower section, when the latter is rotated bodily about its longitudinal axis, relative to said supporting structure and to said intermediate section; a lateral support carried by said intermediate section; a wide-face cylindrical gear rotatably mounted on said support adjacent to the upper end of said lower section; power-driven means for rotating said gear; a relatively narrow face gear formed on the upper portion of said lower section in constant mesh with the teeth of said cylindrical gear, whereby to impart rotation to the lower section in all positions of vertical movement of said lower section with respect to the intermediate section; a plug member rotatable bodily with and mounted for sliding movement in an axial bore formed in said lower section, the lower end of said plug member projecting below the corresponding end of said lower section and being exteriorly threaded; and means yieldably resistant to upward movement thereof for maintaining said plug member in its lowered position of operation.

12. In a machine for molding glass articles; a supporting structure; a plunger assembly depending from said structure; said assembly including tubular, vertically aligned, upper, intermediate and lower sections; threaded means uniting adjoining interfitting portions of said upper and intermediate sections to vary the total length of the assembly; guide rod means forming a part of the supporting structure; an upper bracket fixed to the upper section and slidably mounted on said rod means; threaded connecting means uniting contiguous portions of said intermediate section with said lower section, said last-named threaded means operative upon rotation of said lower section about its longitudinal axis to cause the same to move upwardly or downwardly with respect to the intermediate section; power-driven means for imparting rotation to said lower section; a plug member positioned in an axial bore formed in said lower section for limited sliding movement therein and for bodily rotation with said lower section; the lower end of said plug member projecting below the corresponding end of said lower section and being exteriorly threaded for mold insertion; a flanged mold-engaging ring positioned in engagement with the lower end of said lower section; a lower bracket carried by said supportnig structure and slidably mounted on said rod means; means carried by said lower bracket for supporting said mold-engaging ring; a spring-carrying rod slidably mounted at its upper end in said upper bracket; a foot ring fixed to the lower end of said spring rod; and a coil spring surrounding said spring rod and confined between said upper bracket and said foot ring, whereby to apply downwardly directed forces to said lower bracket and mold-engaging ring associated therewith.

References Cited in the file of this patent

UNITED STATES PATENTS

| | | |
|---|---|---|
| 820,479 | Croskey | May 15, 1906 |
| 913,212 | Johnson | Feb. 23, 1909 |
| 1,159,992 | Rau | Nov. 9, 1915 |
| 1,144,527 | Brookfield et al. | June 29, 1915 |
| 1,590,481 | Stenhouse et al. | June 29, 1926 |
| 1,783,191 | La France | Dec. 2, 1930 |
| 1,856,577 | McLaughlin | May 3, 1932 |
| 1,885,302 | Slick | Nov. 1, 1932 |
| 1,888,255 | Anderson | Nov. 22, 1932 |
| 1,888,396 | Slick | Nov. 22, 1932 |
| 2,052,343 | Du Bois | Aug. 25, 1936 |